(12) United States Patent
Qiao et al.

(10) Patent No.: US 12,107,697 B2
(45) Date of Patent: Oct. 1, 2024

(54) MEDIA STREAM SENDING METHOD AND APPARATUS, AND DEVICE

(71) Applicant: Huawei Technologies Co., Ltd., Shenzhen (CN)

(72) Inventors: Naiqiang Qiao, Nanjing (CN); Xia Zhu, Nanjing (CN); Jun Zhou, Nanjing (CN); Qi Bu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/385,501

(22) Filed: Jul. 26, 2021

(65) Prior Publication Data

US 2021/0352336 A1 Nov. 11, 2021

Related U.S. Application Data

(63) Continuation of application No. PCT/CN2020/086349, filed on Apr. 23, 2020.

(30) Foreign Application Priority Data

Apr. 23, 2019 (CN) .......................... 201910330894.3

(51) Int. Cl.
*H04L 12/18* (2006.01)
*H04N 7/15* (2006.01)
(Continued)

(52) U.S. Cl.
CPC ...... *H04L 12/1822* (2013.01); *H04L 12/1818* (2013.01); *H04N 7/15* (2013.01);
(Continued)

(58) Field of Classification Search
CPC ........... H04N 21/2183; H04N 21/2187; H04N 21/238; H04N 21/222; H04N 21/43079;
(Continued)

(56) References Cited

U.S. PATENT DOCUMENTS 8,416,937 B2 * 4/2013 Bentley .................... H04N 7/15
709/204
9,055,312 B2 * 6/2015 Civanlar ............ H04N 21/4788
(Continued)

FOREIGN PATENT DOCUMENTS

CN 103475900 A 12/2013
CN 103841468 A 6/2014
(Continued)

OTHER PUBLICATIONS

Zhang, Zhenwei., et al, "Caching Systems for Living Video on Network" Computer Engineering, vol. 28, Supplementary Issue, Aug. 2002, With an English Translation Version, 12 pages.
(Continued)

*Primary Examiner* — Gregory Todd
(74) *Attorney, Agent, or Firm* — Conley Rose, P.C.

(57) ABSTRACT

A media stream sending method provides a live media stream for a client that enters a live broadcast room. A proxy server receives, from a first client, a first live broadcast room request message for requesting to enter the live broadcast room; the proxy server determines a role of the first client based on the first live broadcast room request message; and if the role of the first client is a slave user, the proxy server sends a first live media stream cached in the proxy server to the first client, where the first live media stream is a media stream that is sent by a media server to a second client through the proxy server, and a role of the second client is a master user.

20 Claims, 17 Drawing Sheets

(51) Int. Cl.
    *H04N 21/2183* (2011.01)
    *H04N 21/2187* (2011.01)
    *H04N 21/238* (2011.01)
    *H04N 21/2743* (2011.01)
(52) U.S. Cl.
    CPC ..... *H04N 21/2187* (2013.01); *H04N 21/2743* (2013.01); *H04M 2203/5027* (2013.01); *H04M 2203/5045* (2013.01); *H04M 2203/5081* (2013.01); *H04N 21/2183* (2013.01); *H04N 21/238* (2013.01)
(58) Field of Classification Search
    CPC ............... H04N 21/43076; H04N 7/15; H04N 21/2743; H04L 67/568; H04L 65/611; H04L 12/1818; H04L 12/1822; H04M 2203/5081; H04M 2203/5027; H04M 2203/5045
    See application file for complete search history.

(56) References Cited

U.S. PATENT DOCUMENTS

| | | | |
|---|---|---|---|
| 10,139,917 B1* | 11/2018 | Nariyawala | H04N 7/15 |
| 2004/0230664 A1* | 11/2004 | Bowers | H04L 12/1836 |
| | | | 709/204 |
| 2013/0041973 A1 | 2/2013 | Zhou | |
| 2013/0173819 A1* | 7/2013 | Lee | H04N 21/2402 |
| | | | 709/231 |
| 2013/0263194 A1 | 10/2013 | Zhang et al. | |
| 2015/0249854 A1 | 9/2015 | Knox et al. | |
| 2015/0355804 A1* | 12/2015 | Nguyen | H04N 21/41407 |
| | | | 715/756 |
| 2016/0165184 A1* | 6/2016 | Aaron | H04L 12/1822 |
| | | | 348/14.08 |
| 2017/0126767 A1* | 5/2017 | Cai | H04L 65/762 |
| 2018/0054649 A1 | 2/2018 | Li et al. | |
| 2018/0077431 A1 | 3/2018 | Wei et al. | |
| 2018/0139412 A1* | 5/2018 | Kiraz | H04L 65/403 |
| 2020/0128617 A1* | 4/2020 | Xian | H04M 1/6066 |
| 2021/0235149 A1* | 7/2021 | Madison | H04N 21/433 |

FOREIGN PATENT DOCUMENTS

| | | |
|---|---|---|
| CN | 106162235 A | 11/2016 |
| CN | 106604064 A | 4/2017 |
| CN | 107332894 A | 11/2017 |
| CN | 108235042 A | 6/2018 |
| CN | 108322787 A | 7/2018 |
| CN | 109104614 A | 12/2018 |
| JP | 2002290952 A | 10/2002 |
| JP | 2015165349 A | 9/2015 |
| JP | 2016197411 A | 11/2016 |
| KR | 100851634 B1 | 8/2008 |
| KR | 101533368 B1 | 7/2015 |
| KR | 101727310 B1 | 4/2017 |
| WO | 2018027237 A1 | 2/2018 |

OTHER PUBLICATIONS

Junxiang, S., "Mainstream Internet live broadcast services in the Cache system," Network and Communication, Oct. 2016, 4 pages.

* cited by examiner

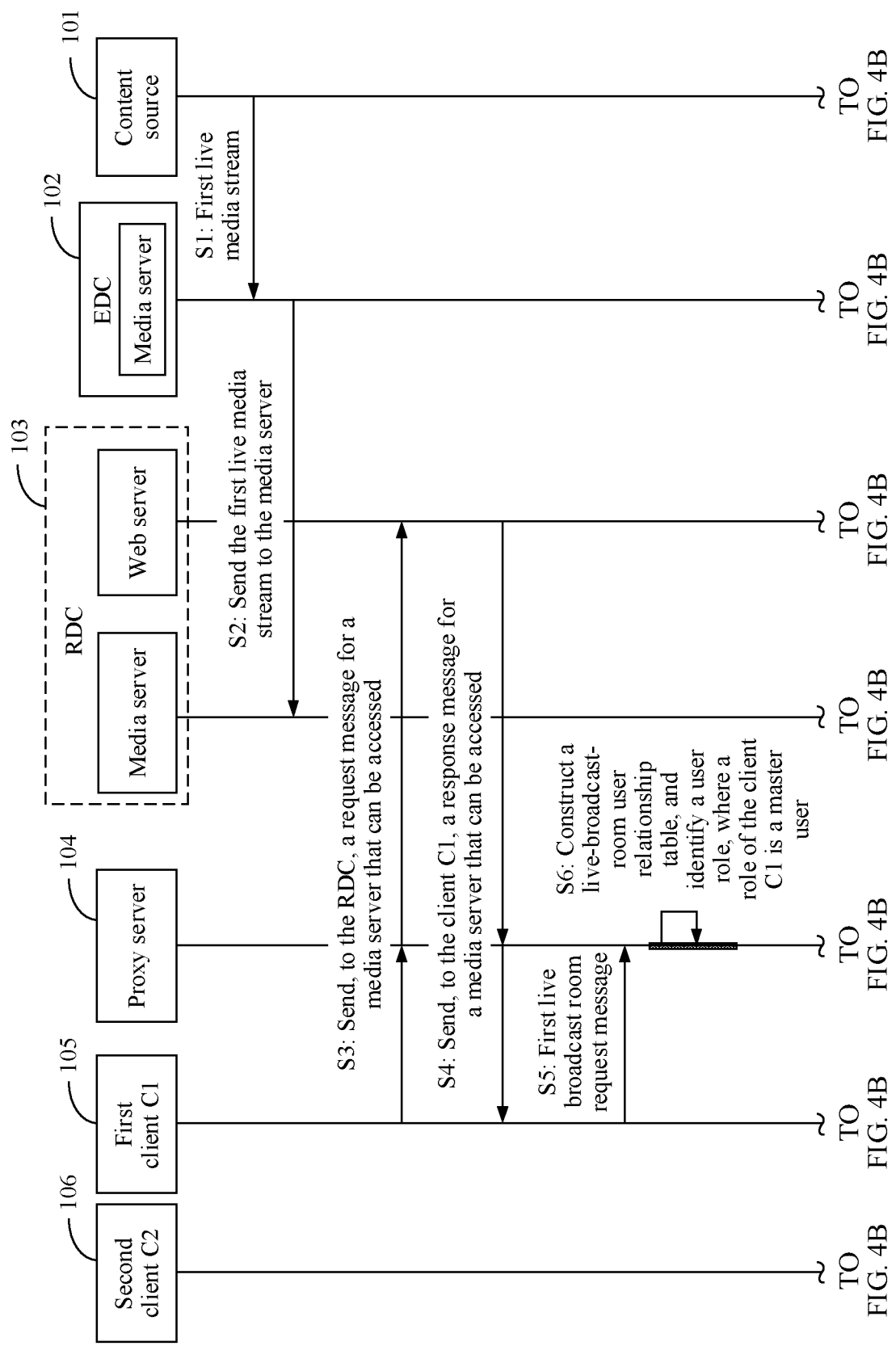

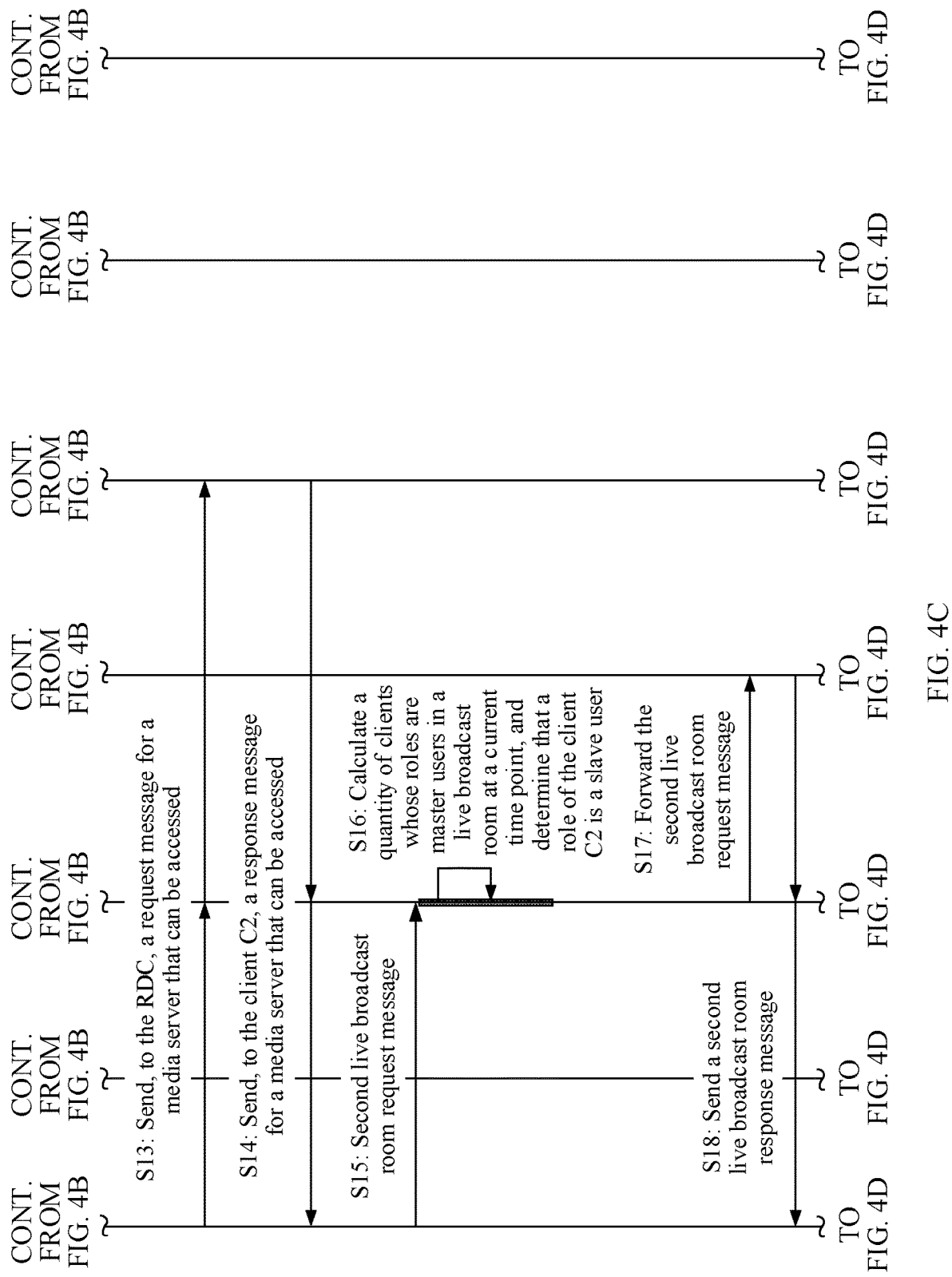

MEDIA STREAM SENDING METHOD AND APPARATUS, AND DEVICE

CROSS-REFERENCE TO RELATED APPLICATIONS

This is a continuation of International Application No. PCT/CN2020/086349, filed on Apr. 23, 2020, which claims priority to Chinese Patent Application No. 201910330894.3, filed on Apr. 23, 2019, both of which are hereby incorporated by reference in their entireties.

FIELD

This disclosure relates to the field of video playing, and in particular, to a media stream sending method and apparatus, and a device.

BACKGROUND

A user may watch a video in a live broadcast mode or a video on demand mode. In the video on demand mode, when watching the video, the user can fast forward or rewind video content at any time, but cannot fast forward or rewind video content in the live broadcast mode. Live broadcast may be generally understood as a process in which all frames of data are labeled with time sequence tags and then are streamed. Specifically, a collection apparatus such as a camera or a microphone continuously collects audio or video information, then performs processing on the information such as encoding, encapsulation, and stream pushing, and then transmits the information through a delivery network. A playing end continuously downloads data, and decodes the data based on a time sequence for playing. An overall procedure of video live broadcast includes a series of processes: collection, encoding, stream pushing, transcoding, delivery, decoding/rendering, and the like.

Mainstream vendors for Internet video live broadcast usually use a unicast transmission protocol for video transmission. Therefore, if N users are watching a video, there are N channels of video streams. In addition, for enterprise live video broadcast, functions such as sharing a presented document and making text comments need to be supported during video live broadcast. That is, the shared document and the text comments are displayed while video content is displayed on a web page of the enterprise live broadcast, to satisfy user requirements and improve user experience.

To improve user experience and save backbone network bandwidth, a live content delivery network (CDN) is typically deployed on a live broadcast platform. The live CDN is a distributed content delivery platform and supports a multi-layer architecture. On the live CDN platform, servers for caching can be deployed at different layers, to provide a nearby service for users in different regions.

In a process of delivering audio and video streams by using the live CDN, a Real Time Message Protocol (RTMP), also referred to as a real time message transport protocol, is typically used in video stream pushing and stream distribution processes; and three protocols are typically used in a delivery process: RTMP, Hypertext Transfer Protocol (HTTP) Live Streaming), and HTTP-Flash Video (FLV). The HLS is an HTTP-based streaming media transmission protocol developed by Apple Inc. The HLS is mainly applied to iOS devices, including iPhones, iPads, iPod touches, and Mac OS X, to provide audio and video live services and recorded content through video on demand (VOD) services. The HLS has the following advantage: By using the HLS, a client does not request a complete data stream at a time; instead, streaming media data is segmented into smaller files with shorter duration at a server end and the smaller files are accessed in sequence based on index files. Audio and video can be played provided that the client continuously and sequentially plays the smaller files obtained from the server.

As shown in FIG. 1, in the live CDN, a content source sends audio and video media streams to an enterprise data center (EDC) using the RTMP, where the EDC includes a web server and a plurality of media servers. The web server in the EDC responds to a request, from a client, for watching a live program, authenticates a user, and allocates a closest media server to provide a service for the user based on a location of the user. The selected media server sends the audio and video media streams to a lower-level region data center (RDC) according to a preset policy. After receiving the media stream (live content), a media server in the RDC delivers, according to a preset policy, the media stream to a lower-level media server in a server room (SR). Finally, the media server in the server room caches the media stream (the live content) delivered by the upper-level media server, and directly provides a live broadcast service for the user.

In this process, the media server in the upper-level RDC needs to send the live media stream to each client that requests the media stream in a live broadcast room, so that the media server in the upper-level RDC needs to send the live media stream to each user in the live broadcast room. When there are a large quantity of users that enter the live broadcast room, a large quantity of wide area network (WAN) resources are required for live media stream transmission, resulting in heavy network overheads.

SUMMARY

Embodiments provide a media stream sending method and apparatus, and a device, to reduce resource overheads for sending a media stream by a media server to clients in a same live broadcast room. Specifically, the embodiments disclose the following technical solutions.

According to a first aspect, an embodiment provides a media stream sending method. The method provides a live media stream for a client that enters a live broadcast room. The method includes: A proxy server receives, from a first client, a first live broadcast room request message for requesting to enter the live broadcast room; the proxy server determines a role of the first client based on the first live broadcast room request message; and if the role of the first client is a slave user, the proxy server sends a first live media stream cached in the proxy server to the first client, where the first live media stream is a media stream that is sent by a media server to a second client through the proxy server, and a role of the second client is a master user.

In this method, when a live media stream requested by a client whose role is a master user is obtained by the proxy server, the proxy server locally caches segments of a part of the media stream. When a client whose role is a slave user enters the live broadcast room and requests a live media stream, the proxy server directly sends the locally cached media stream to the client whose role is the slave user, so that the media server does not need to send the live media stream to the proxy server again. Therefore, according to the method provided in the first aspect, the media server does not need to send the live media stream to each client that enters the live broadcast room through the proxy server. This reduces traffic for sending media streams, effectively saves egress bandwidth, and reduces resource overheads.

With reference to the first aspect, in a possible implementation of the first aspect, the determining a role of the first client based on the first live broadcast room request message includes: determining whether there is a client whose role is a master user in the live broadcast room when the first live broadcast room request message is received; and if there is a client whose role is a master user in the live broadcast room, determining that the role of the first client is the slave user.

With reference to the first aspect, in another possible implementation of the first aspect, before the sending a first live media stream cached in the proxy server to the first client, the method further includes: The proxy server receives a first media request message from the first client, and skips forwarding the first media request message to the media server; and the proxy server sends a first media response message to the first client, where the first media response message is used to notify the first client that the first client is allowed to obtain a media stream.

With reference to the first aspect, in still another possible implementation of the first aspect, the first media request message includes an identifier of the first client. After the proxy server sends the first live media stream to the first client, the method further includes: The proxy server receives, from the second client, a request message for exiting the live broadcast room; when determining the first client as a new master user, the proxy server changes the role of the first client from the slave user to the master user; the proxy server sends a second media request message to the media server, where the second media request message includes the identifier of the first client; the proxy server receives a second live media stream that is sent by the media server based on the second media request message; and the proxy server switches, to the second live media stream, the first live media stream that is sent to the first client.

With reference to the first aspect, in still another possible implementation of the first aspect, the determining a role of the first client based on the first live broadcast room request message includes: The proxy server determines whether a quantity of clients whose roles are master users in the live broadcast room reaches a preset upper limit when receiving the first live broadcast room request message, where the preset upper limit is greater than 1; and if the quantity of clients whose roles are master users in the live broadcast room reaches the preset upper limit, the proxy server determines that the role of the first client is the slave user. In this implementation, in a scenario in which there are a plurality of master users, the media server does not need to send a live media stream to the proxy server for each user that enters the live broadcast room through the proxy server, but the proxy server delivers, to clients whose roles are slave users, a live media stream that is requested by a master user and that is cached in the proxy server. This reduces traffic for sending media streams and reduces resource overheads.

With reference to the first aspect, in still another possible implementation of the first aspect, if the quantity of clients whose roles are master users in the live broadcast room is not 0 but does not reach the preset upper limit, the proxy server determines that the role of the first client is a secondary-master user.

With reference to the first aspect, in still another possible implementation of the first aspect, when the first client is the slave user, the method further includes: The proxy server receives, from the second client, a request message for exiting the live broadcast room; when determining the first client as a new secondary-master user, the proxy server changes the role of the first client from the slave user to the secondary-master user; the proxy server sends a third media request message to the media server, where the third media request message includes an identifier of the first client; and the proxy server receives a third live media stream that is sent by the media server based on the third media request message.

With reference to the first aspect, in still another possible implementation of the first aspect, when the second client is a main-master user, and the first client is the secondary-master user, the method further includes: The proxy server sends the first live media stream to the first client.

With reference to the first aspect, in still another possible implementation of the first aspect, when the first client is the secondary-master user, the method further includes: The proxy server receives a fourth media request message from the first client; the proxy server sends the fourth media request message to the media server; and the proxy server receives a fourth live media stream that is sent by the media server based on the fourth media request message.

With reference to the first aspect, in still another possible implementation of the first aspect, when the first client is the secondary-master user, the method further includes: The proxy server receives, from the second client, a request message for exiting the live broadcast room; when determining the first client as a new main-master user, the proxy server changes the role of the first client from the secondary-master user to the main-master user; and the proxy server switches, to the fourth live media stream, the first live media stream that is sent to the first client.

With reference to the first aspect, in still another possible implementation of the first aspect, the method further includes: The proxy server adjusts a timestamp of the fourth live media stream, so that an adjusted timestamp satisfies that a timestamp of the first frame of the fourth live media stream that is sent to the first client and a timestamp of the last frame of the first live media stream that is sent to the first client are consecutive.

With reference to the first aspect, in still another possible implementation of the first aspect, the last frame of the first live media stream that is sent by the proxy server to the first client and the first frame of the fourth live media stream that is sent by the proxy server to the first client are adjacent frames. Before the proxy server switches, to the fourth live media stream, the first live media stream that is sent to the first client, the method further includes: The proxy server identifies, based on the cached first live media stream and the fourth live media stream, a first I frame and a second I frame that belong to the first live media stream and the fourth live media stream respectively, where the first I frame and the second I frame are a same video frame; and the proxy server determines, based on the first I frame and the second I frame, a first switching frame and a second switching frame that are adjacent to each other and that belong to the first live media stream and the fourth live media stream respectively, and uses the first switching frame and the second switching frame as the last frame of the first live media stream that is sent to the first client and the first frame of the fourth live media stream that is sent to the first client respectively.

With reference to the first aspect, in still another possible implementation of the first aspect, the method further includes: The proxy server caches the first live media stream as groups of pictures (GOP).

With reference to the first aspect, in still another possible implementation of the first aspect, before the proxy server switches, to the second live media stream, the first live media stream that is sent to the first client, the method further includes: The proxy server adjusts a timestamp of the second live media stream, so that an adjusted timestamp satisfies that a timestamp of the first frame of the second live media stream that is sent by the proxy server to the first client and a timestamp of the last frame of the first live media stream that is sent by the proxy server to the first client are consecutive.

With reference to the first aspect, in still another possible implementation of the first aspect, the last frame of the first live media stream that is sent by the proxy server to the first client and the first frame of the second live media stream that is sent by the proxy server to the first client are adjacent frames. Before the proxy server switches, to the second live media stream, the first live media stream that is sent to the first client, the method further includes: The proxy server identifies, based on the first live media stream and the second live media stream, a first I frame and a second I frame that belong to the first live media stream and the second live media stream respectively, where the first I frame and the second I frame are a same video frame; the proxy server determines, based on the first I frame and the second I frame, a first switching frame and a second switching frame that are adjacent to each other and that belong to the first live media stream and the second live media stream respectively, and uses the first switching frame and the second switching frame as the last frame of the first live media stream that is sent to the first client and the first frame of the second live media stream that is sent to the first client respectively. After the proxy server determines the first switching frame and the second switching frame, the method further includes: The proxy server forwards the request message, from the second client, for exiting the live broadcast room to the media server.

With reference to the first aspect, in still another possible implementation of the first aspect, before the proxy server sends the first live media stream to the first client, the method further includes: The proxy server adjusts a timestamp of the first live media stream, so that an adjusted timestamp satisfies that a timestamp of the first frame of the first live media stream that is sent by the proxy server to the first client is 0, and timestamps of adjacent frames of the first live media stream that is sent to the first client are consecutive.

According to a second aspect, an embodiment provides a media stream sending apparatus, where the apparatus includes units configured to perform the method steps in the first aspect and the implementations of the first aspect. Specifically, the apparatus includes an obtaining unit and a processing unit, and may further include another module or unit such as a storage module.

According to a third aspect, an embodiment further provides a network device, including a transceiver, a processor, and a memory. The processor is coupled to the memory; and the memory is configured to store instructions; the processor is configured to invoke the instructions to enable the network device to perform the media stream sending method according to any one of the first aspect or the implementations of the first aspect.

Further, the transceiver is configured to receive, from a first client, a first live broadcast room request message for requesting to enter a live broadcast room; the processor is configured to determine a role of the first client based on the first live broadcast room request message; and the transceiver is further configured to: when the role of the first client is a slave user, send a cached first live media stream to the first client, where the first live media stream is a media stream that is sent by a media server to a second client through the network device, and a role of the second client is a master user.

Optionally, in a possible implementation of this aspect, the processor is further configured to: determine whether there is a client whose role is a master user in the live broadcast room when the first live broadcast room request message is received; and if there is a client whose role is a master user in the live broadcast room, determine that the role of the first client is the slave user.

Optionally, in another possible implementation of this aspect, the transceiver is further configured to: before sending the first live media stream cached in the network device to the first client, receive a first media request message from the first client, and skip forwarding the first media request message to the media server; and send a first media response message to the first client, where the first media response message is used to notify the first client that the first client is allowed to obtain a media stream.

Optionally, in still another possible implementation of this aspect, the first media request message includes an identifier of the first client; the transceiver is further configured to: after sending the first live media stream to the first client, receive, from the second client, a request message for exiting the live broadcast room; the processor is further configured to: when determining the first client as a new master user, change the role of the first client from the slave user to the master user; the transceiver is further configured to: send a second media request message to the media server, where the second media request message includes the identifier of the first client; receive a second live media stream that is sent by the media server based on the second media request message; and the transceiver is further configured to switch, to the second live media stream, the first live media stream that is sent to the first client.

Optionally, in still another possible implementation of this aspect, the processor is further configured to: determine whether a quantity of clients whose roles are master users in the live broadcast room reaches a preset upper limit when the first live broadcast room request message is received, where the preset upper limit is greater than 1; and if the quantity of clients whose roles are master users in the live broadcast room reaches the preset upper limit, determine that the role of the first client is the slave user.

Optionally, in still another possible implementation of this aspect, the processor is further configured to: if the quantity of clients whose roles are master users in the live broadcast room is not 0 but does not reach the preset upper limit, determine that the role of the first client is a secondary-master user.

Optionally, in still another possible implementation of this aspect, when the first client is the slave user, the transceiver is further configured to receive, from the second client, a request message for exiting the live broadcast room; the processor is further configured to: when determining the first client as a new secondary-master user, change the role of the first client from the slave user to the secondary-master user; and the transceiver is further configured to send a third media request message to the media server, where the third media request message includes an identifier of the first client, and receive a third live media stream that is sent by the media server based on the third media request message.

Optionally, in still another possible implementation of this aspect, when the second client is a main-master user, and the first client is the secondary-master user, the transceiver is further configured to send the first live media stream to the first client.

Optionally, in still another possible implementation of this aspect, when the first client is the secondary-master user, the transceiver is further configured to: receive a fourth media request message from the first client; send the fourth media request message to the media server; and receive a fourth live media stream that is sent by the media server based on the fourth media request message.

Optionally, in still another possible implementation of this aspect, when the first client is the secondary-master user, the transceiver is further configured to receive, from the second client, a request message for exiting the live broadcast room; the processor is further configured to: when determining the first client as a new main-master user, change the role of the first client from the secondary-master user to the main-master user; and the transceiver is further configured to switch, to the fourth live media stream, the first live media stream that is sent to the first client.

Optionally, in still another possible implementation of this aspect, the processor is further configured to adjust a timestamp of the fourth live media stream, so that an adjusted timestamp satisfies that a timestamp of the first frame of the fourth live media stream that is sent to the first client and a timestamp of the last frame of the first live media stream that is sent to the first client are consecutive.

Optionally, in still another possible implementation of this aspect, the last frame of the first live media stream that is sent by the transceiver to the first client and the first frame of the fourth live media stream that is sent by the transceiver to the first client are adjacent frames.

The processor is further configured to: identify, based on the cached first live media stream and the fourth live media stream, a first I frame and a second I frame that belong to the first live media stream and the fourth live media stream respectively, where the first I frame and the second I frame are a same video frame; and determine, based on the first I frame and the second I frame, a first switching frame and a second switching frame that are adjacent to each other and that belong to the first live media stream and the fourth live media stream respectively, and use the first switching frame and the second switching frame as the last frame of the first live media stream that is sent to the first client and the first frame of the fourth live media stream that is sent to the first client respectively.

Optionally, in still another possible implementation of this aspect, the memory is configured to cache the first live media stream as GOPs.

Optionally, in still another possible implementation of this aspect, the processor is further configured to adjust a timestamp of the second live media stream, so that an adjusted timestamp satisfies that a timestamp of the first frame of the second live media stream that is sent by the transceiver to the first client and a timestamp of the last frame of the first live media stream that is sent by the transceiver to the first client are consecutive.

Optionally, in still another possible implementation of this aspect, the last frame of the first live media stream that is sent by the transceiver to the first client and the first frame of the second live media stream that is sent by the transceiver to the first client are adjacent frames.

The processor is further configured to: identify, based on the first live media stream and the second live media stream, a first I frame and a second I frame that belong to the first live media stream and the second live media stream respectively, where the first I frame and the second I frame are a same video frame; determine, based on the first I frame and the second I frame, a first switching frame and a second switching frame that are adjacent to each other and that belong to the first live media stream and the second live media stream respectively, and use the first switching frame and the second switching frame as the last frame of the first live media stream that is sent to the first client and the first frame of the second live media stream that is sent to the first client respectively; and after determining the first switching frame and the second switching frame, forward, to the media server, the request message, from the second client, for exiting the live broadcast room.

Optionally, in still another possible implementation of this aspect, the processor is further configured to adjust a timestamp of the first live media stream, so that an adjusted timestamp satisfies that a timestamp of the first frame of the first live media stream that is sent to the first client is 0, and timestamps of adjacent frames of the first live media stream that is sent to the first client are consecutive.

Optionally, the network device is the proxy server.

According to a fourth aspect, an embodiment further provides a computer-readable storage medium. The storage medium stores instructions; and when the instructions are run on a computer or a processor, the method according to any one of the first aspect or the implementations of the first aspect is performed.

According to a fifth aspect, an embodiment further provides a computer program product. The computer program product includes computer instructions; and when the instructions are executed by a computer or a processor, the method according to any one of the first aspect or the implementations of the first aspect can be implemented.

According to a sixth aspect, an embodiment further provides a media stream sending system. The system includes at least one client, a proxy server, and a media server. The system implements, by using the proxy server, the media stream sending method according to any one of the first aspect or the implementations of the first aspect. The proxy server is configured to perform the media stream sending method according to any one of the first aspect or the implementations of the first aspect.

Optionally, the proxy server is the media stream sending apparatus according to any one of the second aspect or the implementations of the second aspect.

With reference to the sixth aspect, in a possible implementation of the sixth aspect, the media server is located in an RDC, the RDC further includes a web server, and the web server is configured to allocate a media server to a client that enters a live broadcast room through a proxy server.

With reference to the sixth aspect, in another possible implementation of the sixth aspect, the system further includes an EDC and a content source.

Optionally, the media stream sending system is a CDN system.

In addition, an embodiment further provides a chip system. The chip system includes a processor and an interface circuit. The interface circuit is coupled to the processor. The processor is configured to execute a computer program or instructions, to implement the method according to any one of the first aspect or the implementations of the first aspect. The interface circuit is configured to communicate with another module outside the chip system.

According to the method in the embodiments, when the live media stream requested by the client whose role is the master user is obtained by using the proxy server, the proxy server locally caches the part of segments of the media stream. When the client whose role is the slave user enters the live broadcast room and requests the live media stream, the proxy server directly sends the locally cached media stream to the client whose role is the slave user, so that the media server does not need to send the live media stream to the proxy server again. According to this method, the media server does not need to send the live media stream to each client that enters the live broadcast room through the proxy server. This reduces traffic for sending media streams, effectively saves egress bandwidth, and reduces resource overheads.

In addition, according to this method, for all the clients in the same live broadcast room, the media server needs to send only one live media stream to the proxy server, that is, wide area network bandwidth for transmitting the one live media stream is required. In comparison with transmission resources occupied for sending the live media stream to all the clients by the media server, this reduces load of a wide area network link, avoids, after all the clients receives the live broadcast media, video freezing during playing of the live media stream, and therefore further improves user experience by using this method.

BRIEF DESCRIPTION OF THE DRAWINGS

FIG. 4A to FIG. 4D are a signaling flowchart of a media stream sending method according to an embodiment.

DETAILED DESCRIPTION

To make a person skilled in the art better understand the technical solutions in the embodiments, and make the objectives, features, and advantages of the embodiments clearer, the following further describes the technical solutions in the embodiments in detail with reference to the accompanying drawings.

Before the technical solutions in the embodiments are described, a scenario of the embodiments is first described with reference to the accompanying drawings.

The technical solutions may be applied to a CDN system. The system includes a proxy server. The proxy server is configured to: act as a proxy for a video bearer protocol of a user, identify roles of all clients that enter a live broadcast room through the proxy server, obtain a live media stream from a media server based on a media request message of a client whose role is a master user, and deliver the live media stream to all the clients that enter the live broadcast room through the proxy server.

The system to which the technical solutions are applied may include a plurality of proxy servers, and each of the proxy servers can perform an operation performed by the proxy server in the embodiments. In other words, the proxy server in the embodiments may be any proxy server in the system to which the embodiments are applied. In the embodiments, the following described client is a client that enters the live broadcast room through the proxy server, and the proxy server identifies the roles (for example, a master user and a slave user) of all the clients that enter the live broadcast room through the proxy server. Correspondingly, the following described client whose role is a master user in the live broadcast room is a client, among the clients that enter the live broadcast room through the proxy server, that is identified as the master user by the proxy server. Similarly, the following described client whose role is a slave user is a client, among the clients that enter the live broadcast room through the proxy server, that is identified as the slave user by the proxy server.

The proxy server may be a device at an edge of a local area network, and a client in the local area network enters the live broadcast room through the proxy server and obtains a live media stream of the live broadcast room through the proxy server.

Optionally, the proxy server may be deployed on a server, or deployed on universal customer premise equipment (uCPE) through network functions virtualization (NFV).

Figure 1:
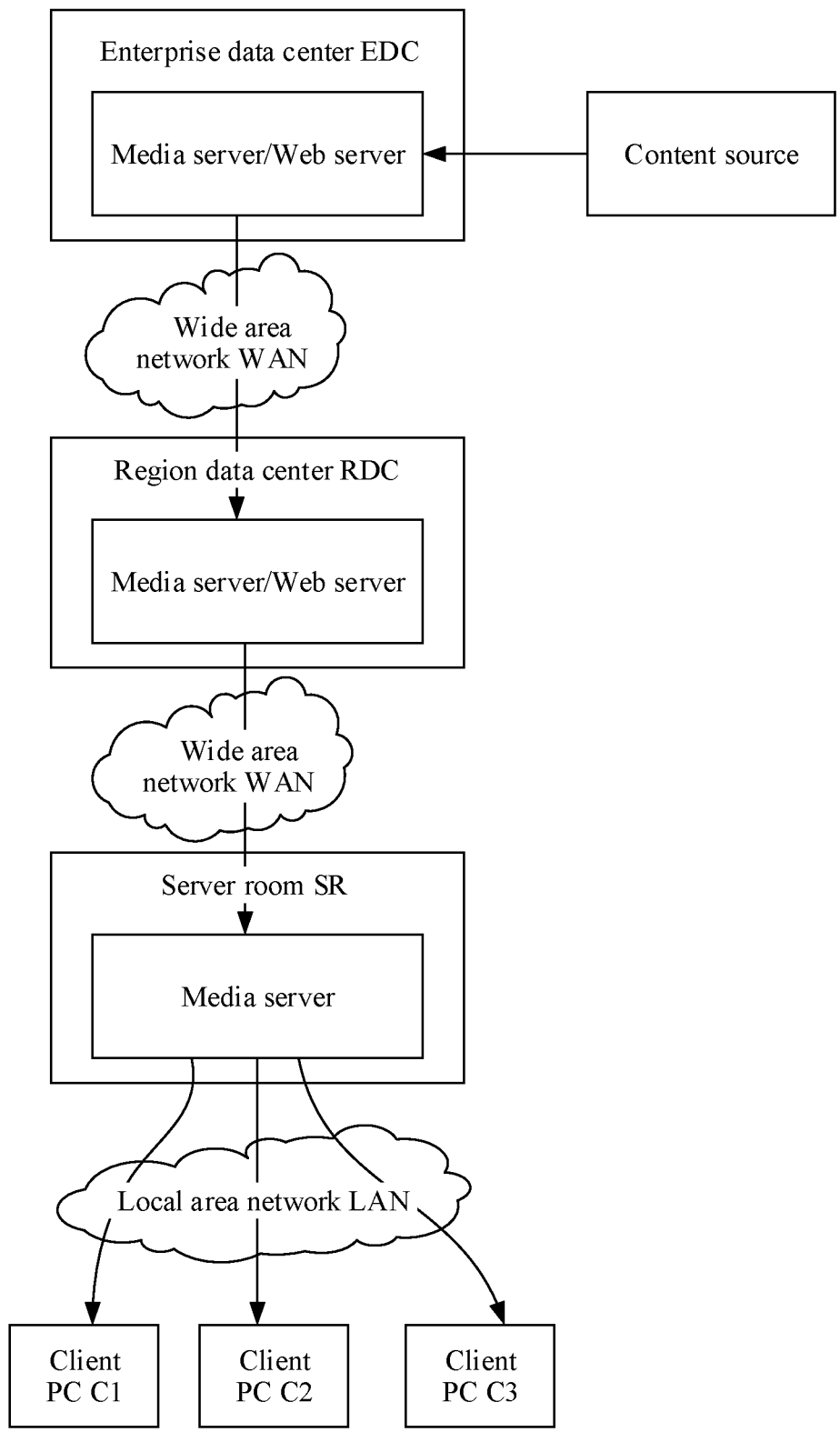
FIG. 1 is a schematic diagram of an architecture of a live broadcast system.
Figure 2:
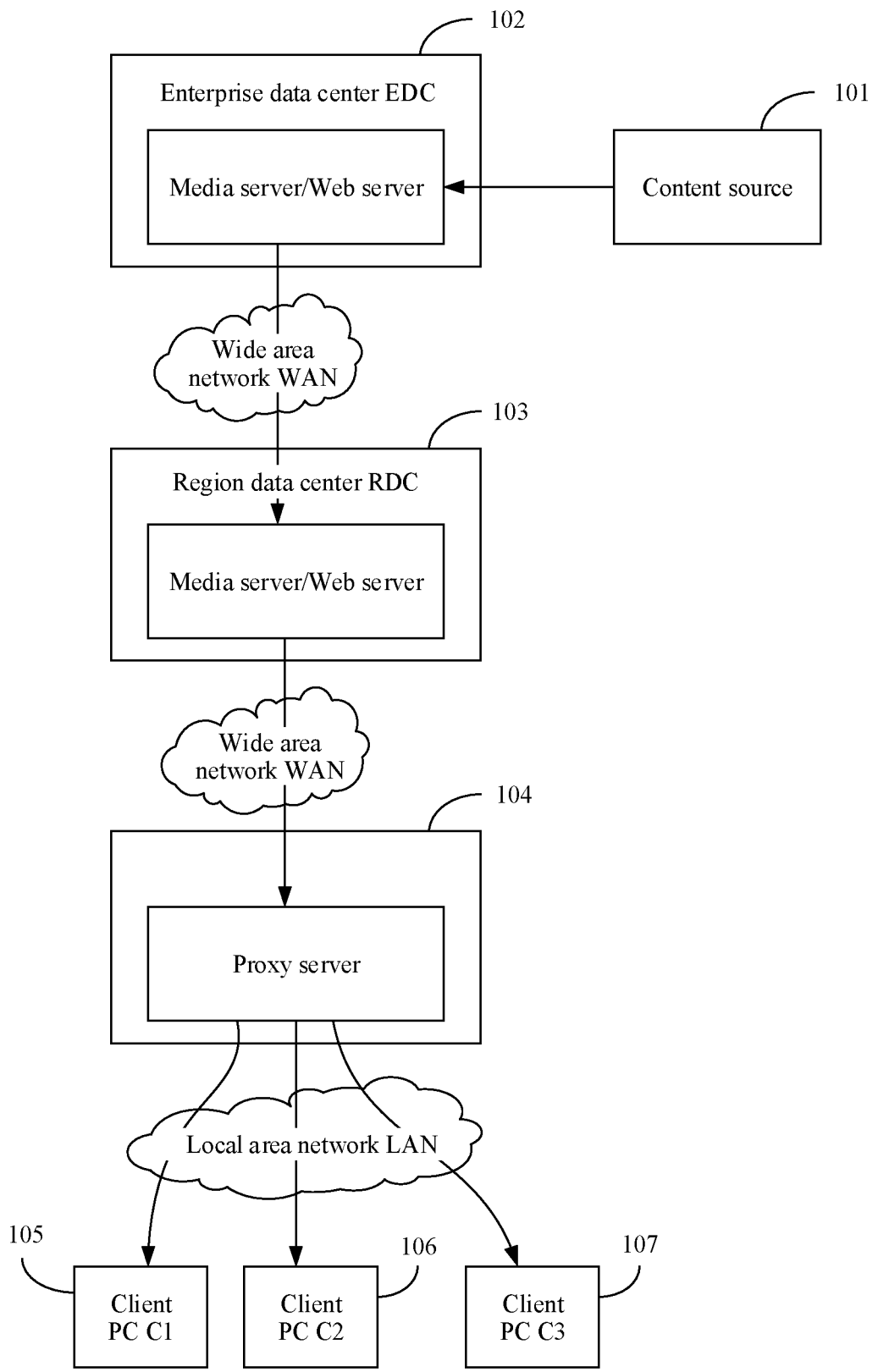
FIG. 2 is a schematic diagram of an architecture of a unilateral proxy system for video live broadcast according to an embodiment.

Further, as shown in FIG. 2, in a video CDN system provided in this embodiment, the system includes: a content source 101, an EDC 102, an RDC 103, a proxy server 104, and at least one client (C). For example, the at least one client includes a first client C1 105, a second client C2 106, and a third client C3 107. The EDC 102 includes a plurality of media servers and a web server, and the RDC 103 includes a plurality of media servers and a web server.

The live CDN is a distributed content delivery platform and supports a multi-layer architecture. On the live CDN platform, the plurality of servers for caching can be deployed at different layers, to provide a nearby service for users in different regions. When a user in the EDC watches live broadcast in a live broadcast room, an allocated media server is deployed in the RDC, and a transmitted live media stream reaches the RDC through a multi-protocol label switching (MPLS) private line.

Further, general descriptions of functions of the foregoing devices or network elements are provided in the following Table 1.

TABLE 1

| Network element name | Function |
| --- | --- |
| Content source | Is a production end of live media streams. |
| EDC Web server | Responds to requests, from clients, for watching live broadcast, authenticates users, and allocates closest media servers to the users based on locations of the users. |

TABLE 1-continued

| | | |
|---|---|---|
| | Media server | Caches media streams sent by the content source and sends the media streams to a lower-level media server, or directly provides services for users. |
| RDC | Web server | Responds to the requests, from the clients, for watching live broadcast, authenticates users, and allocates closest media servers to the users based on locations of the users. |
| | Media server | Caches the media streams (live broadcast content) sent by the upper-level media server and sends the media streams to a lower-level media server, or directly provides services for users. |
| Proxy server | | Acts as a proxy for a video bearer protocol of users, identifies roles of clients, initiates media stream requests to the media server by using roles of users, duplicates media streams sent by the media servers, and delivers the media streams to all clients in a live broadcast room. |
| Client | | Is a user that watches live broadcast. |

Figure 3:
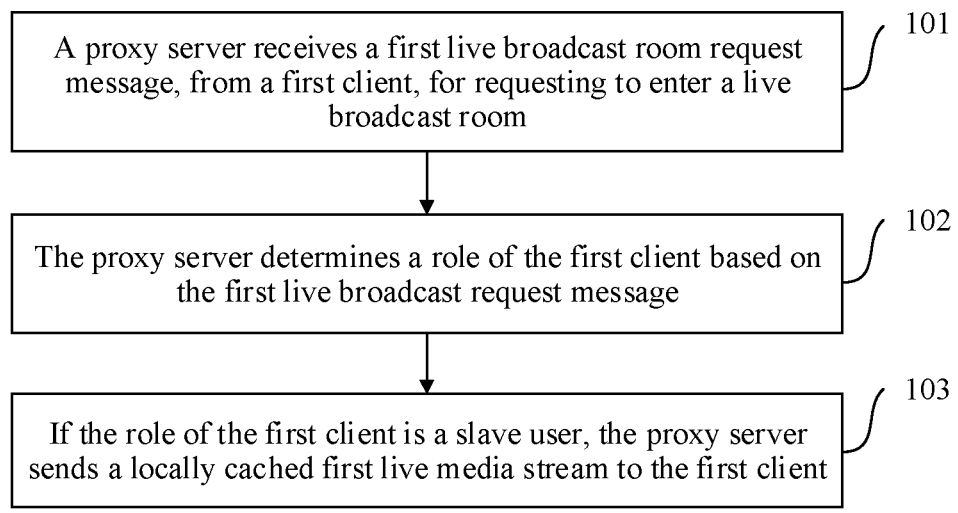
FIG. 3 is a flowchart of a media stream sending method according to an embodiment.
Figure 4B:
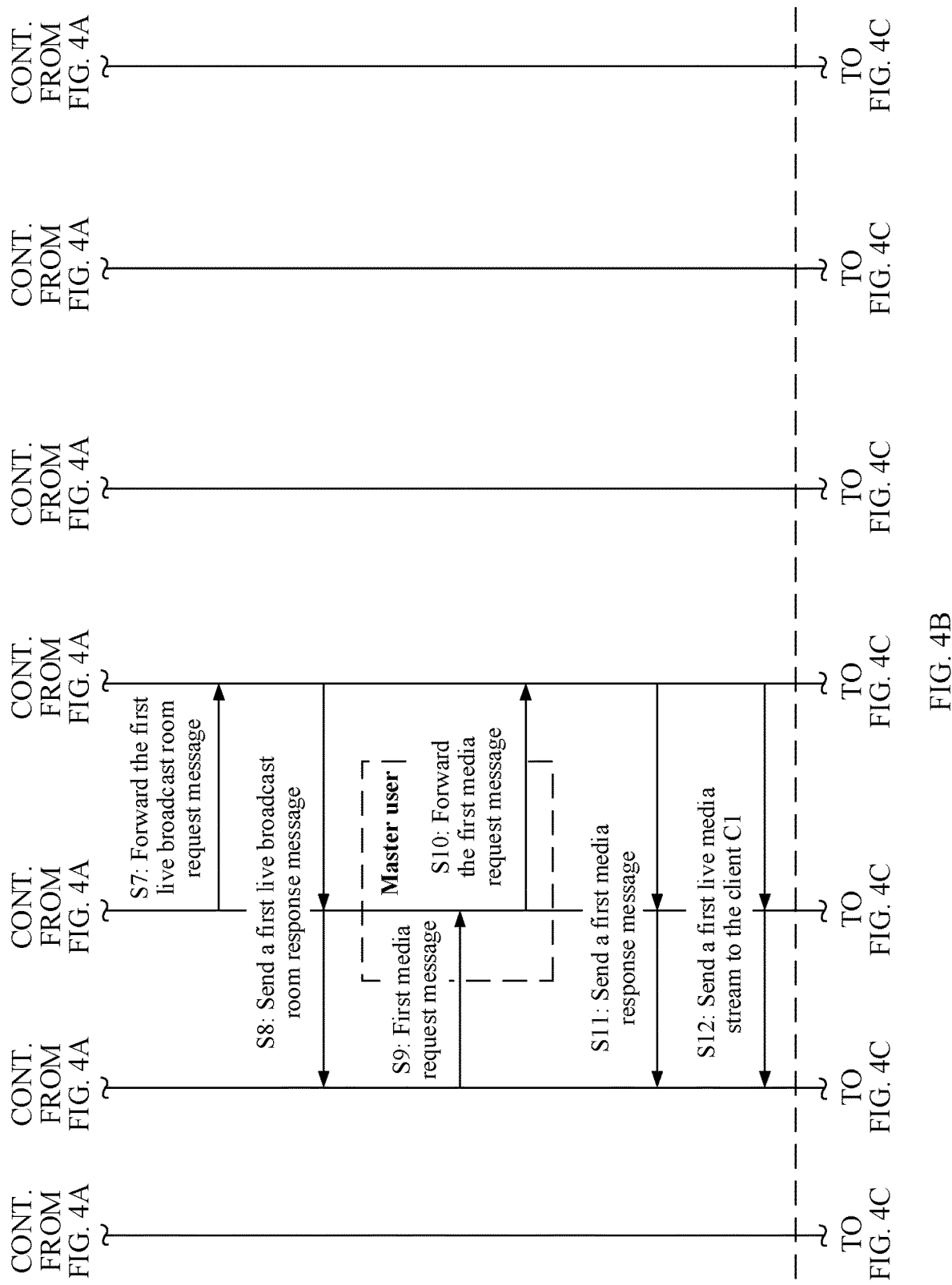
Figure 4D:
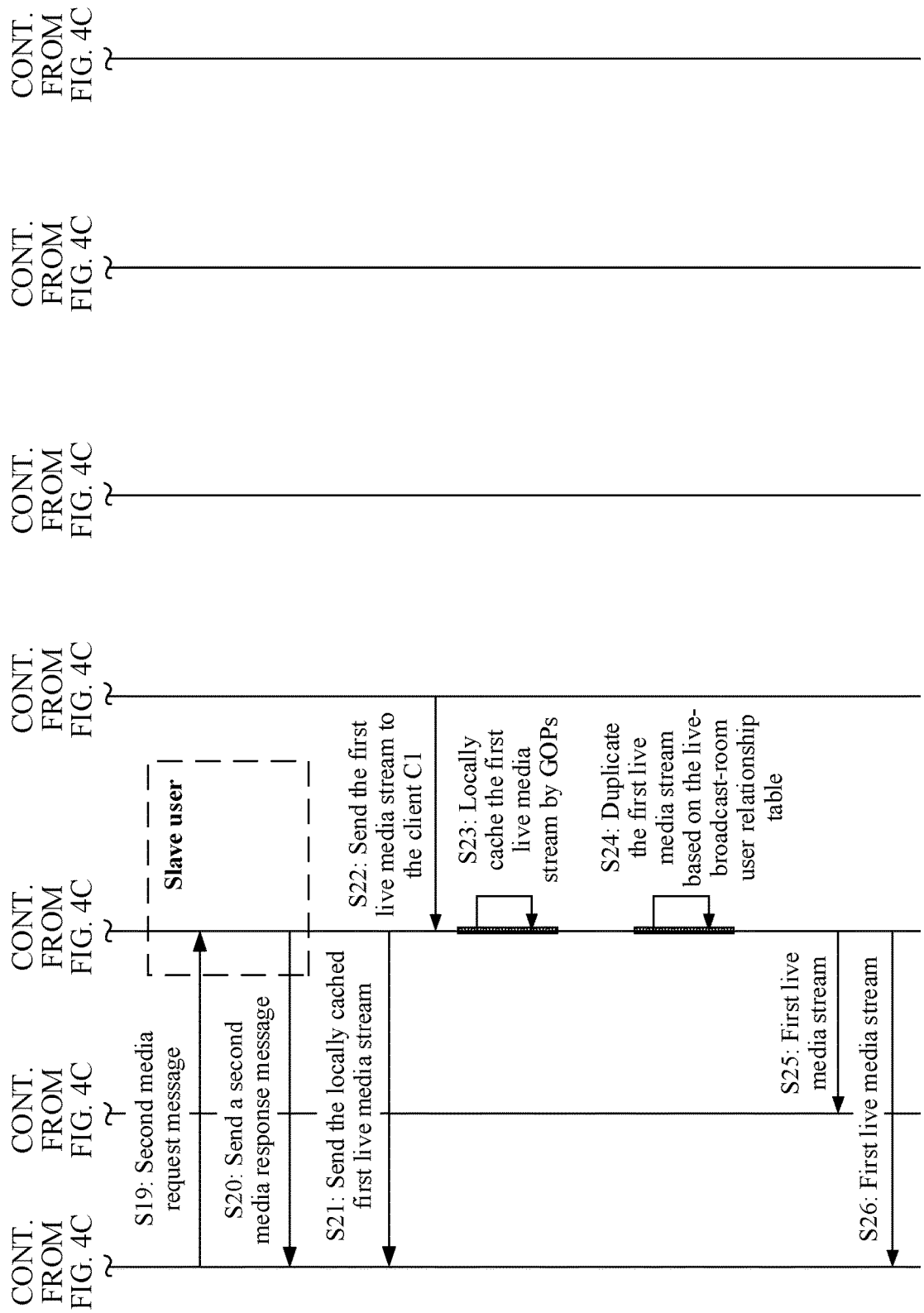

An embodiment provides a media stream sending method, to resolve a problem that a large quantity of network resources are occupied when a live media stream is transmitted from an RDC to an SR and then to a client. The method is applied to a proxy server, and the proxy server is configured to provide a live media stream for at least two clients that enter a live broadcast room. Specifically, as shown in FIG. 3, the method includes the following steps.

Step 101: The proxy server receives, from a first client, a first live broadcast room request message for requesting to enter the live broadcast room, where the first live broadcast room request message includes a first identifier of the first client, for example, an IP address of a client C1.

Step 102: The proxy server determines a role of the first client based on the first live broadcast room request message, where the role of the first client may be a master user or a slave user.

Specifically, step 102 includes: The proxy server determines whether there is a client whose role is a master user in the live broadcast room when receiving the first live broadcast room request message; and if there is a client whose role is a master user in the live broadcast room, the proxy server determines that the role of the first client is the slave user, or if there is no client whose role is a master user in the live broadcast room, the proxy server determines that the role of the first client is the master user. Whether there is a client whose role is a master user in the live broadcast room may be specifically determined based on a quantity of clients whose roles are master users when the first live broadcast room request message is received. If the quantity reaches a preset upper limit, the proxy server determines that the current client is the slave user; otherwise, the proxy server determines that the first client is the master user.

The preset upper limit is an upper limit of a quantity of clients that enter the live broadcast room through the proxy server and that are determined as master users.

In addition, in this embodiment, a client whose role is a master user is briefly referred to as a master-user client, and a client whose role is a slave user is briefly referred to as a slave-user client. In this embodiment, there may be two cases for the preset upper limit based on different values of the preset upper limit: a preset upper limit being 1 and a preset upper limit greater than 1.

Specifically, when the preset upper limit is 1, among all clients that are set to access the live broadcast room through the proxy server, a quantity of master-user clients is 1, that is, there is only one master user. Such a scenario may be referred to as a scenario in which there is a single master user. When the preset upper limit is greater than 1, that is, when the quantity of master-user clients is greater than or equal to 2, there may be specifically one main-master user and a plurality of secondary-master users. Such a scenario may be referred to as a scenario in which there are a plurality of master users.

Further, for the scenario in which there are a plurality of master users, the determining a role of the first client includes: when the first live broadcast room request message is received, and if the quantity of clients whose roles are master users in the live broadcast room is not 0, determining that the role of the first client is a main-master user; or if the quantity is not 0 but does not reach the preset upper limit, determining that the role of first client is a secondary-master user.

Step 103: When determining that the role of the first client is the slave user, the proxy server sends a locally cached first live media stream to the first client.

The first live media stream is a media stream that is sent through the proxy server by a media server to the client whose role is the master user. In this embodiment, in the technical scenario in which there is a single master user, a role of a second client is a master user. In the technical scenario in which there are a plurality of master users, the role of the second client is specifically a main-master user.

Before step 103, the method further includes: The proxy server receives, from the second client, a second live broadcast room request message for entering the live broadcast room; obtains the first live media stream from the media server; caches the first live media stream; and sends the first live media stream to the second client through the proxy server. When the first live media stream is obtained, if there is another client in the live broadcast room that enters the live broadcast room through the proxy server, the proxy server further sends the first live media stream to the another client. In specific implementation, the second client may request to enter the live broadcast room by sending the second live broadcast room request message and request a live media stream by sending a media request message. In this case, after receiving the media request message that is sent by the second client, the proxy server forwards the media request message to the media server to obtain the first live media stream. Alternatively, by sending the second live broadcast room request message, the client may request to enter the live broadcast room and request a live media stream. In this case, after receiving the second live broadcast room request message, the proxy server forwards the second live broadcast room request message to the media server to obtain the first live media stream.

Optionally, after receiving the first live media stream, the proxy server locally caches the first live media stream as GOPs. The GOP may refer to a picture sequence between two I frames. The I frame, also referred to as an intra picture, typically refers to the first frame of each GOP obtained through Moving Picture Experts Group (MPEG) technology processing. Further, the MPEG technology processing includes appropriately compressing a video picture, so that the I frame can be used as a reference for random access and other pictures do not need to be referred to.

In this embodiment, for example, three GOPs are cached locally. For example, time segments of the three GOPs of a cached live media stream are t1-t2, t2-t3, and t3-t4.

When the first client requests to obtain a live media stream, the proxy server determines and verifies that the role of the first client is the slave user, and directly sends the locally cached first live media stream to the first client, so as to prevent the proxy server from requesting and obtaining the live media stream from the media server again. In other words, the media server needs to send only one live media stream to the proxy server, and the proxy server can duplicate and deliver the live media stream to all clients serving as slave users in the live broadcast room. Therefore, wide area network bandwidth for only one live media stream is consumed for users that enter the same live broadcast room. Using the method reduces traffic for sending media streams between the media server in an RDC and an SR in an existing system, effectively saves egress bandwidth, and reduces resource overheads.

In addition, using the method further reduces load of a wide area network link, avoids video freezing during playing of a live video that is sent to the client, and avoids affecting another service. Therefore, using the method further improves user experience.

In the scenario in which there is a single master user, the first client is the slave user, and the second client is the master user. Before step 103, the method further includes: The proxy server receives the first media request message that is sent by the first client. Because the first client is the slave user, the proxy server does not forward the first media request message to the media server. The proxy server sends a first media response message to the first client, where the first media response message is used to notify the first client that the first client is allowed to obtain a media stream. Further, the media stream that is allowed to be obtained is the first live media stream, and the first live media stream is a media stream that is sent by the media server to the client whose role is the master user.

In addition, this embodiment further includes: The master-user client in the live broadcast room exits the live broadcast room, another client in the live broadcast room is selected as a new master user, and a media stream from the new master user is sent to a client in the live broadcast room. Specifically, the method includes: The proxy server receives, from the second client, a request message for exiting the live broadcast room; when determining the first client as the new master user, the proxy server changes the role of the first client from the slave user to the master user; the proxy server sends a second media request message to the media server, where the second media request message includes the identifier of the first client; the proxy server receives a second live media stream that is sent by the media server based on the second media request message; and the proxy server switches, to the second live media stream, the first live media stream that is sent to a client (including the first client) in the live broadcast room.

In this implementation, when the second client serving as the master user exits the live broadcast room, the proxy server selects, as the new master user, the first client serving as the slave user, and requests and obtains the live media stream by using an identity of the first client, and then the proxy server duplicates and delivers the live media stream to another client in the live broadcast room, so as to ensure that a user in the live broadcast room watches a video smoothly.

Both the roles of the first client and the second client in the live broadcast room and the quantity of master-user clients can be determined based on a live-broadcast-room user relationship table. The live-broadcast-room user relationship table records information about each client, and the information about each client includes information such as a live broadcast room request message; an IP address, a port number, a user role, and a user name that are of a client; an IP address and a port number that are of the media server; and a name of the live broadcast room. The proxy server determines a quantity of master users by calculating live broadcast room request messages of all users in the live broadcast room currently, and then determines the role of the first client based on the quantity of master users and the preset upper limit.

In addition, before the proxy server sends a live media stream (for example, the first live media stream or the second live media stream) to a client (for example, the first client) in the live broadcast room, the method further includes: adjusting a timestamp of the live media stream. Specifically, the method further includes: adjusting the timestamp of the media stream according to Formula $y=x+\Delta t$, where y represents a timestamp after adjustment, x represents a timestamp before adjustment, and $\Delta t$ represents a time difference.

If the media stream is a 1st channel of live media stream that is received by the client after the client enters the live broadcast room, for example, in step 103, if the first live media stream is the 1st channel of live media stream that is received by the first client after the first client enters the live broadcast room, the proxy server adjusts the timestamp of the media stream according to the formula, so that an adjusted timestamp satisfies the following constraints:
1. a timestamp of the first frame of the live media stream that is sent by the proxy server to the client is 0; and
2. timestamps of adjacent frames of the live media stream that is sent by the proxy server to the client are consecutive, that is, time lengths of adjacent frames of the sent live video stream are the same, and the time length is a reciprocal of a frame rate f of the live video stream.

Because the live media stream is the 1st channel of live media stream that is received by the client after the client enters the live broadcast room, $\Delta t$ represents an opposite number of the timestamp, before adjustment, of the first frame of the live media stream that is sent by the proxy server to the client.

If the client has received a media stream, that is, if the media stream sent by the proxy server to the client switches from a media stream of a previous master user to a media stream of a current master user, for example, if the proxy server switches, to the second live media stream, the first live media stream that is sent to the first client, the proxy server adjusts a timestamp of the media stream of the current master user according to the formula, so that an adjusted timestamp satisfies the following constraints:
1. a timestamp of the last frame of the media stream that is of the previous master user and that is sent by the proxy server to the client and a timestamp of the first frame of the media stream that is of the current master user and that is sent to the client are consecutive; and 2. timestamps of adjacent frames of the media stream that is of the current master user and that is sent by the proxy server to the client are consecutive.

For example, in a scenario in which there are one master user and a plurality of slave users, it is assumed that a time length of a GOP of the first live media stream cached by the proxy server is 5 seconds (s), three GOPs are cached locally, and content of the three GOPs is updated in real time. If the second client C2 is a client that first enters the live broadcast room, the role of the client C2 at the 0th second is the master user, and the client C2 continuously watches the first live media stream in the live broadcast room until the 60th second arrives. In this case, three GOPs of the video media stream locally cached by the proxy server are as follows: media content from the 45th second to the 50th second, media content from the 50th second to the 55th second, and media content from the 55th second to the 60th second. The three GOPs are segments of the media stream that are sent by the media server to the client C2, and a timestamp of each correspondingly sent frame is relative time of the client C2.

The first client C1 enters the live broadcast room at the 60th second, and the role of the first client C1 is the slave user. The proxy server needs to send, to the client C1, a latest first live media stream that is sent to the client C2 and that is locally cached. In this case, a live media stream closest to the 60th second is the media content of the third GOP segment, and the media content from the 55th second to the 60th second is cached. The 55th second is a timestamp of a frame sent by the media server, and therefore a time difference that needs to be adjusted is $\Delta t=y-x=0-55=-55$ s, that is, the proxy server needs to reduce a timestamp by 55 seconds when sending the first live media stream to the client C1, so as to satisfy the foregoing constraints. In this way, each user that enters the live broadcast room can watch the live broadcast video at the 0th second with no need to wait, and all the users in the live broadcast room can watch the video "synchronously".

In addition, when the second client C2 exits the live broadcast room, the timestamp of the video media stream further needs to be adjusted. Specifically, if the client C2 exits the live broadcast room at the 120th second of video playing, the proxy server needs to select a client as the new master user. It is assumed that in this embodiment, the first client C1 is selected as the master user. Then, the proxy server changes the first live media stream that is originally sent to the client C2 to a live media stream that is sent to the client C1. A corresponding timestamp adjustment process is as follows:

It is assumed that at the 120th second, media content of three GOPs locally cached by the proxy server is as follows: media content from the 105th second to the 110th second, media content from the 110th second to the 115th second, and media content from the 115th second to the 120th second. After 10 seconds elapse, a latest GOP 1 cached by the proxy server is the video content from the 115th second to the 120th second, and a timestamp of a frame in the GOP 1 is relative time of the client C2. After the client C2 exits the live broadcast room, the proxy server locally caches a GOP 2 and a GOP 3: media content from the 0th second to the 5th second and media content from the 5th second to the 10th second. Timestamps of the two GOPs are relative time of the client C1. Therefore, an adjusted time difference is calculated as $\Delta t=120-55-0=65$ s, that is, a timestamp of a frame of the live media stream that is sent by the proxy server to the client C1 serving as the new master user needs to increase by 65 seconds.

Based on the foregoing descriptions, there may be two cases for calculating the adjusted time difference. Details are as follows.

Case 1: If a client has not received a media stream, that is, if a current media stream is a first channel of media stream that is received by the client after the client enters the live broadcast room, the time difference is $\Delta t=0-t2=-t2$, where t2 represents a timestamp of the first frame of a media stream that is received by the proxy server from the media server and that needs to be forwarded to the client.

Case 2: If a client has received a media stream, that is, if a media stream that is sent by the proxy server to the client is switched from a media stream of the previous master user to a media stream of the current master user, a time difference is $\Delta t=(t1+m)-t2$, where t2 represents a timestamp, before adjustment, of the first frame of a media stream (the media stream of the current master user) that is sent by the proxy server to the client after media stream switching, and t1 represents a timestamp, after adjustment, of the last frame of a media stream (the media stream of the previous master user) that is sent by the proxy server to the client before media stream switching. A timestamp of a corresponding next video frame is t1+m, and m=1/f. For example, f=20 fps, and a time length of a sent video frame is m=1 s/20=0.05 s, that is 50 ms.

According to the foregoing method, before the proxy server switches, to the second live media stream, the first live media stream that is sent to the first client, the method further includes: The proxy server adjusts a timestamp of the second live media stream, so that an adjusted timestamp satisfies that a timestamp of the first frame of the second live media stream that is sent by the proxy server to the first client and a timestamp of the last frame of the first live media stream that is sent by the proxy server to the first client are consecutive.

Further, the last frame of the first live media stream that is sent by the proxy server to the first client and the first frame of the second live media stream that is sent by the proxy server to the first client are adjacent frames. Before the proxy server switches, to the second live media stream, the first live media stream that is sent to the first client, the method further includes: The proxy server identifies, based on the first live media stream and the second live media stream, a first I frame and a second I frame that belong to the first live media stream and the second live media stream respectively, where the first I frame and the second I frame are a same video frame; and determines, based on the first I frame and the second I frame, a first switching frame and a second switching frame that are adjacent to each other and that belong to the first live media stream and the second live media stream respectively, and uses the first switching frame and the second switching frame as the last frame of the first live media stream that is sent to the first client and the first frame of the second live media stream that is sent to the first client respectively. After determining the first switching frame and the second switching frame, the proxy server forwards the request message, from the second client, for exiting the live broadcast room to the media server.

In this embodiment, the proxy server sends the live media stream of the master user to each client that enters the live broadcast room through the proxy server. Each time a master user is switched, the proxy server switches, to the live media stream of the current master user, the live media stream that is of the previous master user and that is sent to each client, that is, the proxy server stops sending the media stream of the previous master user to each client, and starts to send the live media stream of the current master user to the client. For example, when the client C1 exits the live broadcast room, the proxy server stops sending the first live media stream to the client C1, and sends the second live media stream of the newly selected client C2 to another client in the live broadcast room that is watching the live broadcast stream. In this case, the role of the client C2 changes to the master user. In addition, when sending a new media stream, the first frame of the live media stream that is of the current master user and that is sent to any client by the proxy server is adjacent to the last frame of the live media stream that is of the previous master user and that is sent to the client. That is, the first frame of the second live media stream that is sent to the client C2 is adjacent to the last frame of the originally sent first live media stream.

In the scenario in which there are a plurality of master users, the second client is a main-master user, the first client is a slave user, and the process in which the client exits the live broadcast room includes: The proxy server receives a request message, from the second client, for exiting the live broadcast room; the proxy server changes the role of the first client from the slave user to a secondary-master user when determining the first client as the new secondary-master user; and the proxy server sends a third media request message to the media server, receives a third live media stream that is sent by the media server based on the third media request message, and locally caches the third live media stream in the proxy server by GOPs, where the third media request message includes the identifier of the first client.

In this embodiment, after obtaining a live media stream, the proxy server does not forward the live media stream to the client serving as the secondary-master user, but the proxy server locally caches segments of the live media stream, so as to deliver the cached segments of the live media stream to a user in the live broadcast room when a role of the secondary-master user is switched to a main-master user.

Optionally, in the scenario in which there are a plurality of master users, if the first client is the secondary-master user, and the proxy server obtains a fourth live media stream from the media server based on a fourth media request message that is sent by the first client, when the second client serving as a main-master user exits the live broadcast room, the method further includes: When determining the first client as the new main-master user, the proxy server changes the role of the first client from the secondary-master user to the main-master user, and the proxy server switches, to the fourth live media stream, the first live media stream sent to the client (including the first client) in the live broadcast room.

The proxy server adjusts a timestamp of the fourth live media stream, so that an adjusted timestamp satisfies that a timestamp of the first frame of the fourth live media stream that is sent to the first client and a timestamp of the last frame of the first live media stream that is sent to the first client are consecutive.

Further, the last frame of the first live media stream that is sent by the proxy server to the first client and the first frame of the fourth live media stream that is sent by the proxy server to the first client are adjacent frames. Before the proxy server switches, to the fourth live media stream, the first live media stream sent to the first client, the method further includes: The proxy server identifies, based on the cached first live media stream and the fourth live media stream, a first I frame and a second I frame that belong to the first live media stream and the fourth live media stream respectively, where the first I frame and the second I frame are a same video frame.

The proxy server determines, based on the first I frame and the second I frame, a first switching frame and a second switching frame that are adjacent to each other and that belong to the first live media stream and the fourth live media stream respectively, and uses the first switching frame and the second switching frame as the last frame of the first live media stream that is sent to the first client and the first frame of the fourth live media stream that is sent to the first client respectively. For a more specific timestamp adjustment process, refer to the descriptions in the foregoing embodiment. Details are not described herein again.

In this embodiment, in the technical scenario in which there are a plurality of master users, the proxy server obtains, from the media server, the live media stream requested by the client whose role is the main-master user, and delivers the live media stream to all users in the live broadcast room; and the media server does not need to send the live media stream to the proxy server for each user that enters the live broadcast room through the proxy server. This saves WAN transmission resources between the media server and the proxy server, and reduces overheads for media stream transmission.

In addition, the proxy server further obtains the media stream of the client whose role is the secondary-master user, and locally caches the media stream, so that the media stream is prepared to be used when the client serving as the main-master user exits the live broadcast room. In addition, when a live media stream is switched, media stream alignment and timestamp adjustment are performed, to ensure that a client in the live broadcast room that is still watching media content does not perceive the switching. This ensures user experience.

It should be noted that, the first live media stream, the second live media stream, the third live media stream, and the like described in this embodiment are a same live media stream that is sent by the content source. The media streams are used to distinguish between live media streams that are obtained by the proxy server based on media request messages of different clients. Because users enter the live broadcast room at different time points, timestamps of live media streams that are sent by the proxy server to the clients are different. Therefore, when sending a live media stream to a client, the proxy server may adjust a timestamp, so that each client that enters the live broadcast room can view current live media content immediately.

The following specifically describes the method provided in the embodiments.

Embodiment 1

This embodiment provides a video live media stream sending method. The method may be applied to the video live broadcast system shown in FIG. 2. The method includes: A media server provides a live media stream for a first client and a second client that enter a live broadcast room, where both the first client and the second client enter the live broadcast room through a same proxy server. Further, as shown in FIG. 4A to FIG. 4D, the method includes 26 steps (S) in total: S1 to S26.

S1 to S12 are a process in which the first client (referred to as a "client C1" hereinafter) enters the live broadcast room and obtains a live media stream. S13 to S26 are a process in which the second client (referred to as a "client C2" hereinafter) enters the live broadcast room and obtains a live media stream.

Specifically, the process in which the client C1 enters the live broadcast room and obtains the live media stream includes the following steps.

S1: A content source sends a first live media stream to a media server in an EDC.

S2: The media server in the EDC receives the first live media stream, and sends the first live media stream to a media server in a lower-level RDC. Before the first live media stream is sent, the method further includes a step in which a web server in the EDC authenticates the media server in the lower-level RDC, and the media server in the EDC sends the first live media stream to the media server in the lower-level RDC only when authentication succeeds.

Optionally, S2 further includes: The proxy server identifies, based on a service feature of the first live media stream, a transmission protocol corresponding to a client served by the proxy server. The service feature includes: an IP address and a port number that are of the web server. For example, for HTTP, a service feature that can be configured includes: the IP address and the port number that are of the web server. Further, the proxy server may further determine that a transmission protocol corresponding to HTTP is Transmission Control Protocol (TCP), for media stream transmission.

S3: The client C1 sends, to a web server in the RDC, a request message for a media server that can be accessed. Further, the request message includes information such as a user name and an IP address that are of the client C1, a name of the live broadcast room, and a key token obtained by the client C1 after authentication succeeds, where the IP address is used to determine a location of the client C1. Specifically, the client C1 sends the request message to the proxy server, and then the proxy server forwards the request message to the web server in the RDC.

S4: The web server in the RDC receives the request message, and sends, to the client C1, a response message for the media server that can be accessed, where the response message is used to notify the client C1 of the media server that can be accessed by the client C1. Specifically, the web server determines, based on the request message, a target media server capable of providing a media stream service for the client C1, where the target media server is one of a plurality of media servers in the RDC; and then sends the response message to the client C1, where the response message includes related information of the target media server, for example, uniform resource locator (URL) information, an IP address, and a port number that are of the target media server.

Optionally, the web server determines the location of the client C1 based on the IP address carried in the request message, sent by the client C1, that is for the media server that can be accessed, and selects a media server closest to the client C1 as the target media server based on the location information.

Optionally, the web server in the RDC sends the response message to the client C1 through the proxy server. The response message carries related information of the target media server, for example, the URL information, the IP address, and the port number that are of the target media server.

S5: The client C1 enters the live broadcast room, and sends, to the proxy server, a first live broadcast room request message for requesting to enter the live broadcast room, where the first live broadcast room request message indicates that the client C1 requests to enter the live broadcast room. The first live broadcast room request message includes the user name, the IP address, and a port number that are of the client C1, the name of the live broadcast room, the token obtained after authentication succeeds, and the like.

S6: The proxy server receives the first live broadcast room request message that is sent by the client C1, and sets a role of the client C1. In a possible implementation, after receiving the first live broadcast room request message, the proxy server determines the role of the client C1 based on a total quantity of clients whose roles are master users; and if the total quantity is less than or equal to a first threshold, the role of the client C1 is a master user, or if the total quantity is greater than the first threshold, the role of the client C1 is a slave user. In this embodiment, assuming that the first threshold is 1, and the client C1 is a user that first enters the live broadcast room, if the quantity of clients whose roles are master users is equal to the first threshold at a current time point, the proxy server determines that the role of the client C1 is the master user.

Alternatively, in another possible implementation, after receiving the first live broadcast room request message, the proxy server determines whether there is a client serving as a master user in the live broadcast room. If there is a client serving as a master user in the live broadcast room, the proxy server determines that the role of the client C1 is a slave user; otherwise, the proxy server determines that the client C1 is the master user.

Optionally, the method further includes: After the client C1 enters the live broadcast room, the proxy server constructs a "live-broadcast-room user relationship table", where the "live-broadcast-room user relationship table" includes an entry about the client C1. Specifically, content of the entry includes: the IP address, the port number, the user role, and the user name that are of the client C1, the IP address and the port number that are of the selected target media server in the RDC, and the name of the live broadcast room. The IP address of the client C1 may be a primary key cached in a database. Understandably, when receiving a request message that is for first entering the live broadcast room and that is sent by the client, the proxy server constructs the live-broadcast-room user relationship table based on the live broadcast room request message, to record a status of each client in the live broadcast room.

In this embodiment, the quantity of clients whose roles are master users is 1. To be specific, among clients that enter the live broadcast room through the proxy server, only one master user is set, and the other clients are slave users. Such a scenario may be referred to as a scenario in which there is a single master user.

S7: The proxy server forwards the first live broadcast room request message to the media server in the RDC.

Step S6 may be performed before step S7 or step S6 may be performed after step S7. This is not strictly limited in this embodiment.

S8: The media server in the RDC receives the first live broadcast room request message, and sends a first live broadcast room response message to the client C1, where the first live broadcast room response message is used to notify the client C1 that the client C1 successfully enters the live broadcast room. Specifically, in S8, the media server forwards the first live broadcast room response message to the client C1 through the proxy server.

S9: The client C1 sends a first media request message to the proxy server, where the first media request message is used to request to obtain the first live media stream from the media server. Optionally, the first media request message carries a first identifier of the client C1, where the first identifier is used to uniquely identify the client C1. In this embodiment, the first identifier includes the IP address and the user name of the client C1 and the like.

S10: The proxy server receives and forwards the first media request message to the media server in the RDC, where the media server is the target media server. The first media request message is requested by the client C1 serving as the master user, and therefore the proxy server forwards the first media request message to the media server.

S11: After receiving the first media request message, the media server sends a first media response message to the client C1, where the first media response message is used to notify the client C1 that the client C1 is allowed to obtain the first live media stream. In a specific implementation, the proxy server receives and forwards the first media response message to the client C1.

S12: The media server sends the first live media stream to the client C1. Specifically, the proxy server obtains, in real time, the first live media stream sent by the media server in the upper-level EDC, and then sends the first live media stream to the proxy server. After receiving the first live media stream, the proxy server locally caches segments of the first live media stream by GOPs. For example, the proxy server caches media stream segments of three latest GOPs: t1-t2, t2-t3, and t3-t4, and all the segments of the cached media stream have a same time length. For example, a time length of each cached GOP is 5 seconds. The proxy server sends the segments of the cached first live media stream to the client C1.

Optionally, in S12, in a process of sending the first live media stream to the client C1, a timestamp of the first live media stream further needs to be adjusted, so that an adjusted timestamp satisfies that a timestamp of the first frame of the first live media stream that is sent to the client C1 is 0, and timestamps of adjacent frames of the first live media stream that is sent to the client C1 are consecutive. "Consecutive" means that time lengths of adjacent video frames of the first live media stream received by the client C1 are the same, and the time length is a reciprocal of a frame rate parameter f.

The following describes the method for which the client C2 enters the live broadcast room and obtains a live media stream. Specifically, the following steps are included.

S13: The client C2 sends, to the web server in the RDC, a request message for a media server that can be accessed, where the request message includes information such as a user name and an IP address that are of the client C2, a name of the live broadcast room, and a key token obtained after the client C2 is authenticated. Specifically, the client C2 forwards the request message to the web server in the RDC through the proxy server; and during forwarding of the request message, the proxy server obtains the information carried in the request message.

S14: The web server in the RDC receives the request message, and sends a response message to the client C2, where the response message is used to notify the client C2 of the media server that can be accessed by the client C2. This is the same as the foregoing step S4, the web server selects one of the plurality of media servers to provide a media stream service for the client C2, and sends related information of the selected media server to the proxy server through the response message. For example, the related information of the selected media server includes URL information, an IP address, and a port number that are of the media server.

S15: The client C2 sends, to the proxy server, a second live broadcast room request message for requesting to enter the live broadcast room, where the second live broadcast room request message indicates that the client C2 requests to enter the live broadcast room. The second live broadcast room request message includes the user name, the IP address, and a port number that are of the client C2, the name of the live broadcast room, the token obtained after authentication succeeds, and the like.

S16: The proxy server receives the second live broadcast room request message that is sent by the client C2, and sets a role of the client C2. A specific implementation is that, after receiving the second live broadcast room request message, the proxy server determines whether there is a client whose role is a master user in the live broadcast room; and if there is a client whose role is a master user in the live broadcast room, the proxy server determines that the role of the client C2 is a slave user. In this embodiment, there is the client C1 serving as the master user in the current live broadcast room, and therefore the client C2 is determined as the slave user.

In addition, S16 further includes: The proxy server adds an entry about the client C2 to the "live-broadcast-room user relationship table". This is similar to adding the entry of the client C1 described above. For the client C2, content of the entry includes information such as the IP address, the port number, the user role, and the user name that are of the client C2, the IP address and the port number that are of the target media server, and the name of the live broadcast room.

Optionally, in S16, a quantity of clients serving as master users currently in the live broadcast room is calculated, and the quantity of clients serving as master users may be determined based on a quantity of live broadcast room request messages that are obtained at a current time point, where the quantity of live broadcast room request messages is recoded in the "live-broadcast-room user relationship table". In this embodiment, the proxy server receives two live broadcast room request messages: the first live broadcast room request message from the client C1 and the second live broadcast room request message from the client C2, and the quantity of live broadcast room request messages is greater than 1. Therefore, it is determined that the client C2 is the slave user. In addition, the quantity of clients serving as master users may be determined in another manner. This is not limited in this embodiment.

S17: The proxy server receives and forwards the second live broadcast room request message to the media server in the RDC.

S18: The media server in the RDC receives the second live broadcast room request message, and sends a second live broadcast room response message to the client C2, where the second live broadcast room response message is used to notify the client C2 that the client C2 successfully enters the live broadcast room. Specifically, the media server forwards the second live broadcast room response message to the client C2 through the proxy server.

S19: The client C2 sends a second media request message to the proxy server, where the second media request message is used to request to obtain a live media stream from the media server. The second media request message carries a second identifier of the client C2, where the second identifier includes the IP address and the user name of the client C2.

The proxy server does not forward the second media request message to the media server because the second media request message is sent by the client C2 whose role is the slave user.

S20: The proxy server receives the second media request message, and sends a second media response message to the client C2, where the second media response message is used to notify the client C2 that the client C2 is allowed to obtain the first live media stream.

S21: The proxy server sends the locally cached first live media stream to the client C2, where the first live media stream is cached and delivered by GOPs. Further, for segments of a media stream that is cached by GOPs, refer to the descriptions in S12. Details are not described herein again.

Optionally, when the proxy server sends the first live media stream to the client C2, the method further includes: adjusting a timestamp of the media stream, so that an adjusted timestamp satisfies two constraints: 1. a timestamp of the first frame of the first live media stream received by the client C2 is 0; and 2. timestamps of adjacent frames of the first live media stream video sent to the client C2 are consecutive, that is, a time length for sending is the reciprocal of the frame rate parameter f. For a specific adjustment process, refer to the descriptions in the foregoing embodiment.

S22: The media server in the RDC sends the first live media stream to the client C1 in real time. Specifically, the first live media stream may be forwarded to the client C1 through the proxy server. The first live media stream is initiated and obtained by the client C1 whose role is the master user in the live broadcast room.

S23: After receiving the first live media stream from the media server, the proxy server locally caches the segments of the live media stream by GOPs. In this embodiment, the proxy server locally caches three GOPs, and may further cache more or fewer GOPs.

S24: The proxy server determines, based on content of entries in the "live-broadcast-room user relationship table", the quantity of clients serving as master users and a quantity of clients serving as slave users, and duplicate the cached segments of the first live media stream, to prepare to send the segments to a client in the live broadcast room. In this embodiment, there are only two clients in the current live broadcast room: the client C1 and the client C2, where the client C1 is the master user, and the client C2 is the slave user.

S25: The proxy server sends the first live media stream to the client C1. In addition, the method further includes: The proxy server adjusts a timestamp in the first live media stream based on a time point at which the client C1 receives a video frame of the media stream.

S26: The proxy server sends the first live media stream to the client C2. In addition, the method further includes: The proxy server adjusts the timestamp in the first live media stream based on a time point at which the client C2 receives a video frame of the media stream.

In addition, a timestamp of a video frame watched by a user that enters the live broadcast room is adjusted, so that the client C1 and the client C2 in the live broadcast room can "synchronously" watch media content of the first live broadcast, thereby improving user experience.

According to the method, when the proxy server is used to obtain the live media stream requested by the client serving as the master user, a part of segments of the media stream are locally cached in the proxy server. When the client whose role is the slave user enters the live broadcast room and requests a live media stream, the locally cached media stream is directly sent to the client serving as the slave user, so that the media server does not need to send the live media stream to the proxy server again, that is, the media server needs to send only one live media stream to the proxy server, and the proxy server can duplicate and deliver the live media stream to all clients serving as slave users in the live broadcast room. This reduces traffic for sending media streams, effectively saves egress bandwidth, and reduces resource overheads.

In addition, according to this method, for all the clients in the same live broadcast room, the media server needs to send only one live media stream to the proxy server, that is, wide area network bandwidth for transmitting the one live media stream is required. In comparison with transmission resources occupied for sending the live media stream to all the clients by the media server, this reduces load of a wide area network link, avoids, after all the clients receives the live broadcast media, video freezing during playing of the live media stream, and therefore further improves user experience by using this method.

In addition, according to the method of this embodiment, the first live broadcast room request message and the first media request message of the client C1 may be combined into one message, and the combined message has functions of the first live broadcast room request message and the first media request message. Therefore, when the role of the client C1 is determined in S6, the quantity of clients serving as master users that enter the live broadcast room currently may be calculated based on a quantity of first media request messages. Similarly, the second live broadcast room request message and the second media request message of the client C2 may also be combined into one message.

Figure 5A:
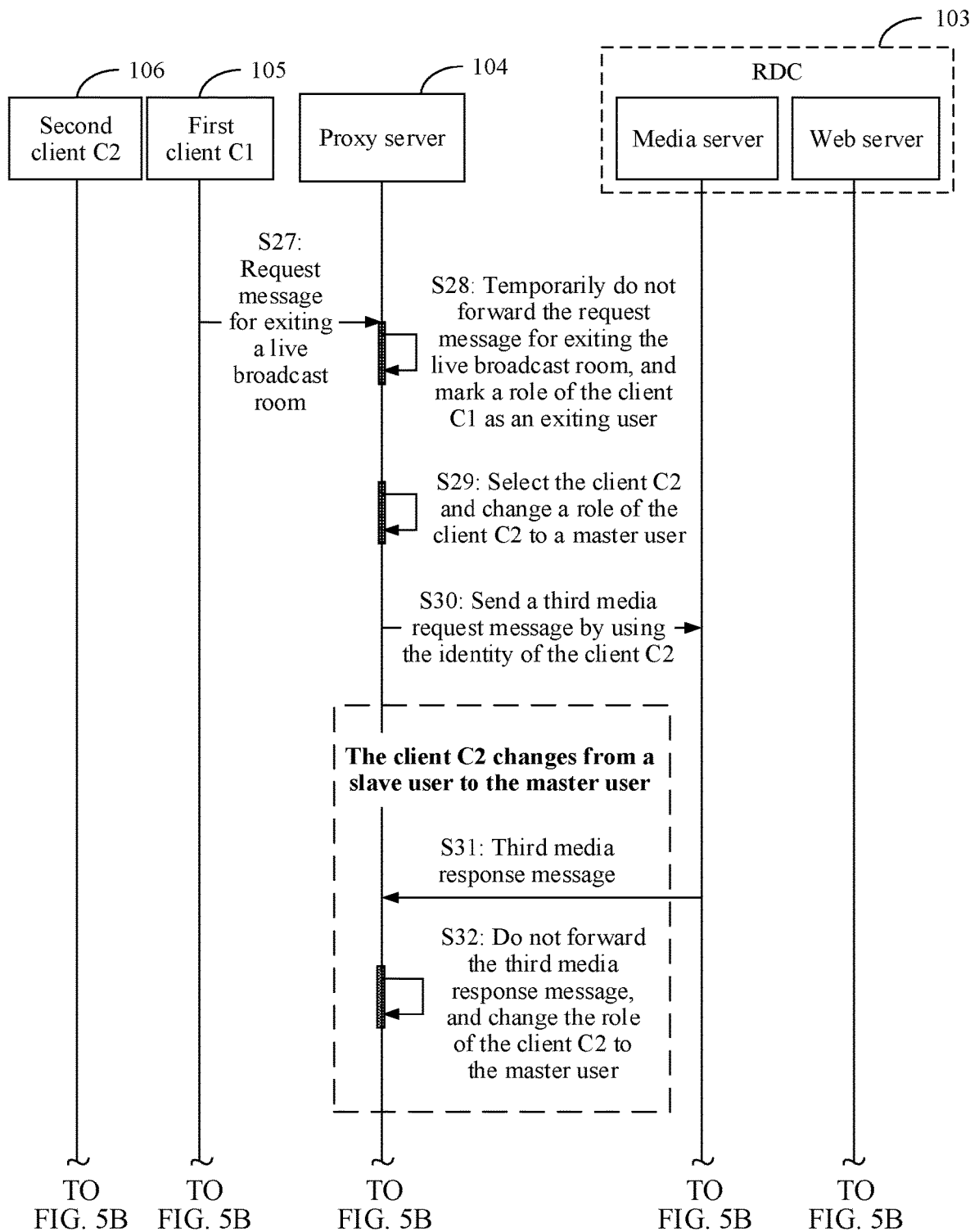
FIG. 5A and FIG. 5B are a signaling flowchart of another media stream sending method according to an embodiment.
Figure 5B:
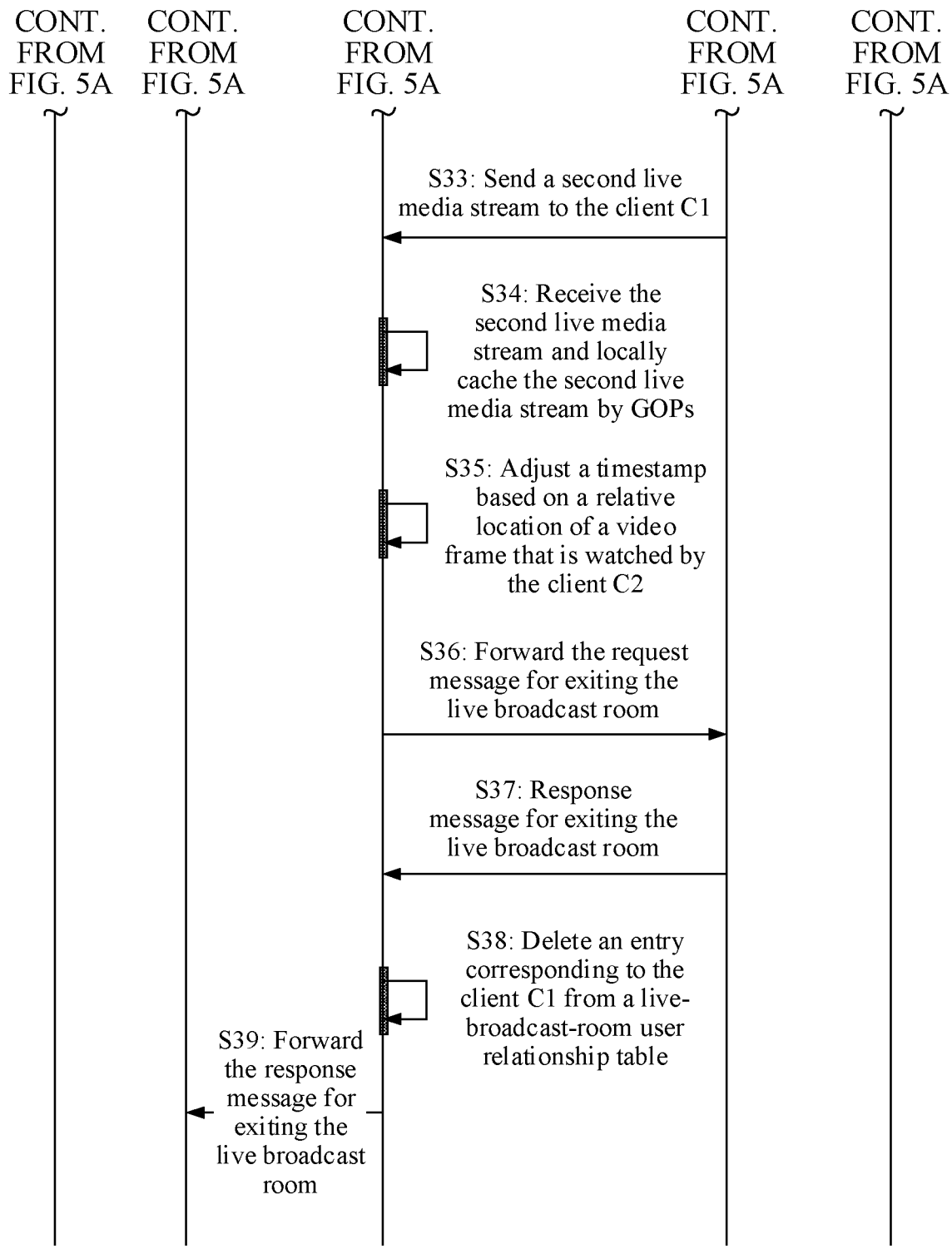

In addition, the method provided in this embodiment further includes a process in which the media server sends a live media stream to the client C2 when the role of the client C2 changes, for example, from the slave user to the master user. Further, as shown in FIG. 5A and FIG. 5B, S27 to S39 are a specific method procedure, which are as follows:

S27: The client C1 sends, to the proxy server, a request message for exiting the live broadcast room, where the request message for exiting the live broadcast room is used to notify the media server that the client C1 is going to exit the live broadcast room. The request message for exiting the live broadcast room includes information such as the user name, the IP address, the port number, and the user role of the client C1, and the live broadcast room name.

S28: After receiving, from the client C1, the request message for exiting the live broadcast room, the proxy server temporarily does not forward, to the media server, the request message for exiting the live broadcast room, because the first live media stream requested by the client C1 whose role is the master user is being watched by the client C2 at this time. In addition, the role of the client C1 is marked as an exiting user, and is recorded in the "live-broadcast-room user relationship table".

S29: The proxy server selects one client in the live broadcast room as a new master user. In this embodiment, there are only the client C1 and the client C2 in the live broadcast room. When the client C1 requests to exit the live broadcast room, the remaining unique client C2 is selected as the client serving as the new master user, and the role of the client C2 is changed from the slave user to the master user, for example, the client C2 is marked as a slave-to-master user.

S30: The proxy server sends, to the media server in the RDC, a third media request message for obtaining a media stream, where the third media request message includes the second identifier of the client C2. The second identifier is used to uniquely identify the client C2. In other words, the second identifier in the third media request message indicates that the role of the client C2 is used to request a live media stream from the media server.

S31: The media server in the RDC receives the third media request message, and sends a third media response message to the client C2, where the third media response message is used to notify the client C2 that the client C2 is allowed to obtain the live media stream.

In addition, the media server receives the second identifier carried in the third media request message, determines that the client C2 initiates the request for obtaining the live media stream to the media server, and further determines that the second identifier carried in the current request message is different from the first identifier carried in the first media request message. The first identifier is used to indicate the client C1, the current second identifier is used to indicate the client C2, and it indicates that a client initiating the live media stream request changes from the client C1 to the client C2.

S32: The proxy server does not forward the third media response message because the role of the client that initiates the third media request message is the slave-to-master user. In this case, the role of the client C2 is changed to the master user, and is recorded in the entry corresponding to the client C2 in the "live-broadcast-room user relationship table".

S33: The media server sends a second live media stream to the client C2 through the proxy server. Content of the second live media stream is the same as content of the first live media stream, and both the second live media stream and the first live media stream are from the content source.

S34: The proxy server receives the second live media stream, and locally caches the second live media stream by GOPs.

In addition, the method further includes: The proxy server aligns, according to an alignment algorithm, live media streams to be sent to the client C1 and the client C2. Specifically, the process includes: Each time the proxy server receives an I frame of the first live media stream, the proxy server compares the I frame with an I frame of the locally cached second live media stream; and each time the proxy server receives an I frame of the second live media stream, the proxy server compares the I frame with an I frame of the locally cached first live media stream. If the proxy server finds, through the foregoing comparison, an I frame belonging to the first live media stream and an I frame belonging to the second live media stream (which are respectively referred to as an I frame a and an I frame b hereinafter), where the two I frames have same media content, the proxy server determines that the two live media streams are aligned. It can be understood that the I frame a and the I frame b are a same video frame, and switching points are determined based on the I frame a and the I frame b, that is, the last frame (which is referred to as a switching frame x hereinafter) of the first live media stream that is sent to each client and the first frame (which is referred to as a switching frame y hereinafter) of the second live media stream that is sent to each client are determined. The switching frame x and the switching frame y are adjacent frames. Specifically, the $n^{th}$ frame after the I frame a in the first live media stream may be determined as the switching frame x, and the $(n+1)^{th}$ frame after the I frame b in the second live media stream may be determined as the switching frame y, where n is an integer greater than or equal to 0. Because the I frame a and the I frame b are a same video frame, the $n^{th}$ frame after the I frame a and the $(n+1)^{th}$ frame after the I frame b are naturally adjacent frames.

S35: The proxy server adjusts a timestamp of the second live media stream based on a relative location of a video frame that is currently watched by the client C2, so that a video frame sent to the client C2 satisfies that a timestamp of the first frame y of the second live media stream received by the client C2 and a timestamp of the last frame x of the first live media stream are consecutive, and a corresponding time length is the reciprocal of the frame rate parameter f. For a specific adjustment process, refer to the descriptions in the foregoing embodiment. Details are not described herein again.

In this embodiment, when the client C1 whose role is the master user exits the live broadcast room, the client C2 serving as the new master user is used to request and obtain the second live media stream, and a time difference between the second live media stream and the originally sent first live media stream is adjusted, so that the proxy server seamlessly switches, when sending the second live media stream to the client C2, from media content of the first live media stream media that is originally being played to the second live media stream. In this way, there are no repeatedly played parts and played content is integral when the video content is watched by the client C2, and user experience of the client C2 is not affected.

S36: The proxy server forwards the request message for exiting the live broadcast room to the media server in the RDC.

S37: After receiving the request message for exiting the live broadcast room, the media server sends, to the client C1, a response message for exiting the live broadcast room, where the response message for exiting the live broadcast room is used to notify the client C1 that the client C1 successfully exits the live broadcast room. Specifically, the response message for exiting the live broadcast room is forwarded to the client C1 through the proxy server.

S38: The proxy server deletes the entry corresponding to the client C1 from the "live-broadcast-room user relationship table". S37 may be performed before S38, or S37 may be performed after S38, and this is not limited.

S39: The proxy server forwards the response message for exiting the live broadcast room to the client C1.

In addition, the method further includes: The proxy server sends the second live media stream to the client C2 that is watching a video in the live broadcast room.

According to the method provided in this embodiment, when the client serving as the master user exits the live broadcast room, the proxy server selects a new client in the live broadcast room as the new master user, and the role of the new master user is used to continue to request a live media stream. After the live media stream is obtained by the new master user, and a timestamp of a video frame is adjusted, the newly obtained live media stream is sent to a client that is still watching a video in the live broadcast room, so that the other client is not affected when the client serving as the master user exits. According to this method, during switching of a live media stream, there are no repeatedly played parts and the played content is integral, and user experience is improved because the other user in the live broadcast room is unaware of the switching of the live media stream.

Embodiment 2

This embodiment provides another live media stream sending method. The method is applied to a technical scenario in which there are a plurality of master users. The plurality of master users mean that a specified quantity (namely, a preset upper limit) of clients, in a live broadcast room, whose roles are master users is greater than or equal to 2. Further, the plurality of master users include one main-master user, which may be identified as a main-master user; include a plurality of secondary-master users, which may be identified as secondary-master users; and further include at least one client whose role is a slave user. A process of requesting to enter a live broadcast room and obtaining a live media stream in this method is the same as the process described in Embodiment 1. A difference lies in identifying and changing of a role of a client and delivery of a live media stream.

Figure 6A:
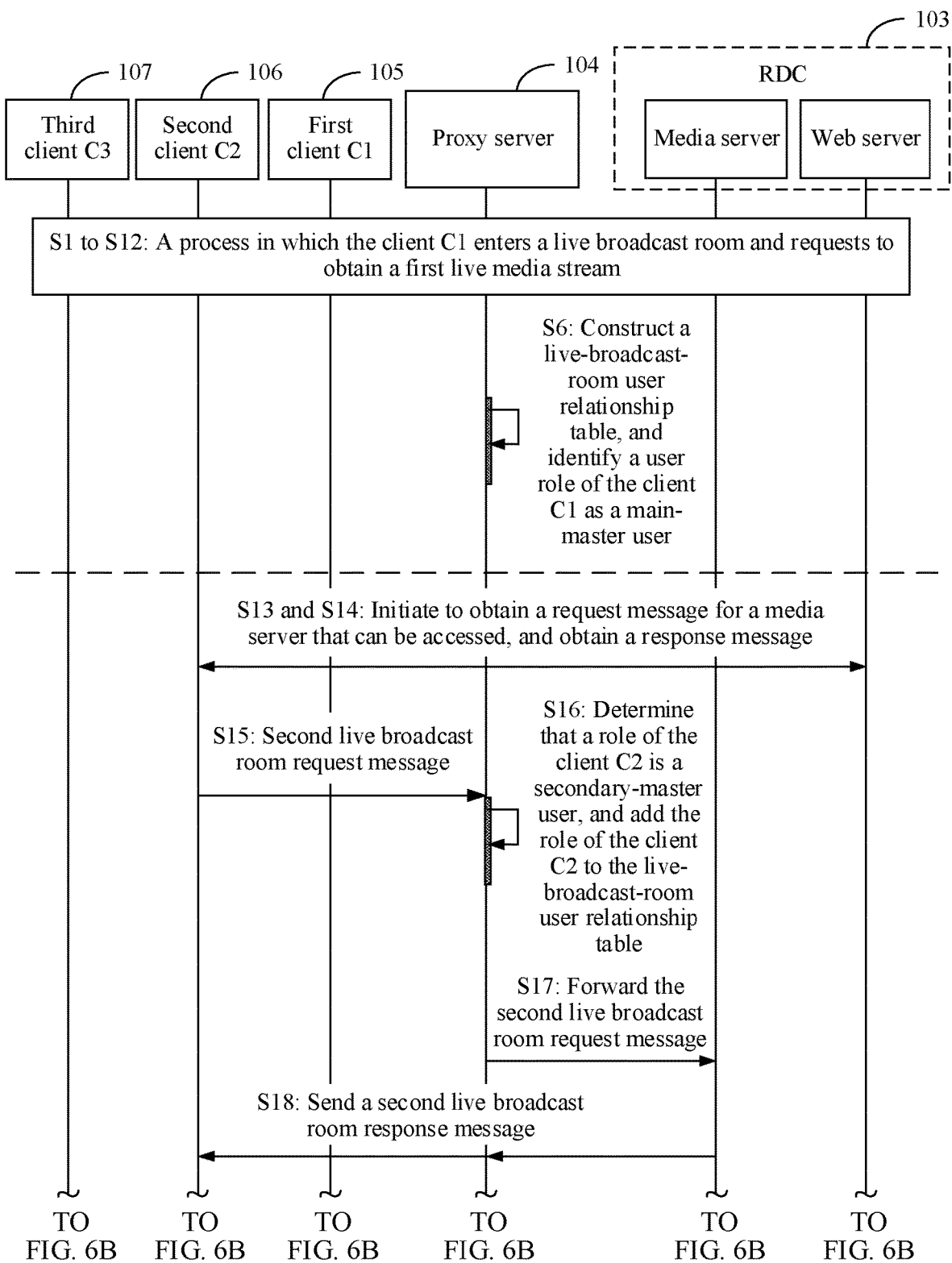
FIG. 6A and FIG. 6B are a signaling flowchart of still another media stream sending method according to an embodiment.
Figure 6B:
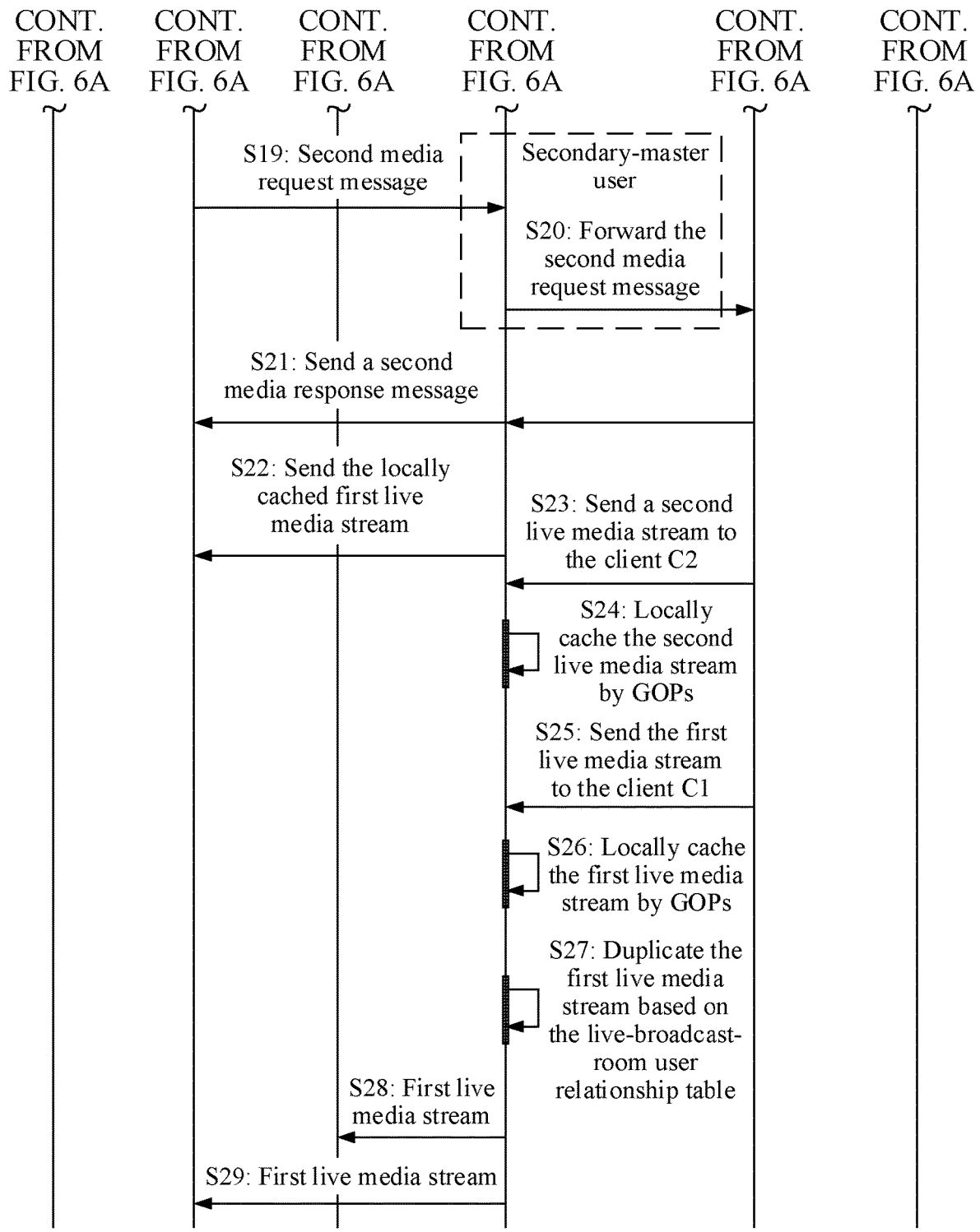

Based on Embodiment 1, in this embodiment, a third client C3 is further included, and a quantity of clients whose roles are master users in the live broadcast room is set to 2, that is, a preset upper limit is 2. In this case, the process in which each client enters the live broadcast room and requests to obtain the live media stream includes the following steps, as shown in FIG. 6A and FIG. 6B.

S1 to S12 are a process in which a client C1 enters the live broadcast room, and requests to obtain a live media stream. This process is the same as S1 to S12 in Embodiment 1, and an only difference lies in: In S6, a role of the client C1 is set as a main-master user when a "live-broadcast-room user relationship table" is established. For the other steps, refer to the descriptions in Embodiment 1. Details are not described herein again.

When a proxy server obtains a first live media stream that is sent by a media server, the proxy server locally caches several segments of the first live media stream by GOPs, updates the segments of the first live media stream in real time, and sends the segments of the first live media stream to the client C1.

S13 to S29 are a process in which a client C2 enters the live broadcast room, and requests to obtain a live media stream. Specifically, details are as follows.

S13 and S14 are a process in which the client C2 enters the live broadcast room, initiates a request message for obtaining a media server that can be accessed, and obtains a response message. This is the same as S13 and S14 in Embodiment 1, and details are not described again.

S15: The client C2 sends a second live broadcast room request message to the proxy server.

S16: After receiving the second live broadcast room request message that is sent by the client C2, the proxy server calculates a quantity of live broadcast room request messages in the current live broadcast room, and determines a role of the client C2 based on the calculated quantity. In this embodiment, the proxy server obtains two live broadcast room request messages from the client C1 and the client C2. In addition, if the quantity is equal to the preset upper limit 2, the proxy server determines that the role of the client C2 is a secondary-master user. Alternatively, when the proxy server receives the second live broadcast room request message, and a quantity of clients whose roles are master users in the live broadcast room reaches the preset upper limit, the proxy server determines that the role of the client C2 is the slave user.

Optionally, if the quantity of clients whose roles are master users in the live broadcast room is not 0 but does not reach the preset upper limit, the proxy server determines that the role of the client C2 is the secondary-master user. If the quantity of clients whose roles are master users in the live broadcast room is 0, the proxy server determines that the role of the client C2 is a main-master user.

In addition, the method further includes: adding an entry about the client C2 to the "live-broadcast-room user relationship table".

S17: The proxy server forwards the second live broadcast room request message to the media server.

S18: The media server in an RDC receives the second live broadcast room request message, and sends a second live broadcast room response message to the client C2, where the second live broadcast room response message is used to notify the client C2 that the client C2 successfully enters the live broadcast room.

S19: The client C2 sends a second media request message to the proxy server.

S20: After receiving the second media request message, the proxy server forwards the second media request message to the media server. The second media request message includes a second identifier of the client C2, so that the client C2 requests, by using the role of the secondary-master user of the client C2, a live media stream from the media server.

S21: The media server sends a second media response message to the client C2, to notify the client C2 that the client C2 is allowed to obtain the first live media stream.

S22: The proxy server sends the locally cached first live media stream to the client C2, where the first live media stream is media stream segments that are cached by GOPs. For example, the proxy server caches three GOP segments. Optionally, the method further includes: The proxy server adjusts a timestamp of the first live media stream based on play time of a video frame obtained by the client C2, so that an adjusted timestamp satisfies that a timestamp of the first frame of the first live media stream sent to the client C2 is 0 and timestamps of adjacent frames of the first live media stream sent to the client C2 are consecutive.

S23: The media server sends a second live media stream to the client C2 in real time.

S24: The proxy server receives segments of the second live media stream and caches the segments by GOPs. Because the second live media stream is obtained by a client by using the role of the secondary-master user, only the second live media stream is cached locally in the proxy server, and is not duplicated and delivered to other clients based on the "live-broadcast-room user relationship table".

In addition, the method further includes: aligning the first live media stream and the second live media stream. Specifically, a process of aligning the two live media streams is the same as S34 in the foregoing Embodiment 1. Details are not described herein again.

S25: The media server sends the first live media stream to the client C1 in real time.

S26: After receiving the first live media stream, the proxy server caches several segments of the first live media stream by GOPs.

S27: The proxy server makes one copy of the first live media stream based on the "live-broadcast-room user relationship table" because there is the only one client C2, in addition to the client C1 whose role is a master user in the current live broadcast room. It should be understood that, if there are more clients, a quantity of copies is the same as a quantity of clients whose user roles are not exiting users in the current live broadcast room.

In this embodiment, the proxy server locally caches a live media stream of the client whose role is the main-master user and a live media stream of the client whose role is the secondary-master user. The proxy server may directly deliver, to all clients in the live broadcast room, the live media stream of the client whose role is the main-master user. The proxy server locally caches the corresponding live media stream of the client whose role is the secondary-master user, to make preparations for subsequent switching and delivery. A specific trigger condition is: When the role of the client serving as the secondary-master user is changed to the main-master user, the media stream (locally cached in the proxy server) of the new main-master user is delivered to other clients in the live broadcast room. The proxy server can quickly deliver a new live media stream. This helps increase a delivery speed and improve efficiency of the media stream, and reduces a waiting time.

S28: The proxy server sends the first live media stream to the client C1.

S29: The proxy server sends the first live media stream to the client C2.

Optionally, in steps S28 and S29, the method further includes: The proxy server adjusts a timestamp of the first live media stream based on play time of the client C1 and play time of the client C2, to ensure synchronization of live content watched by the clients in the live broadcast room.

Figure 7A:
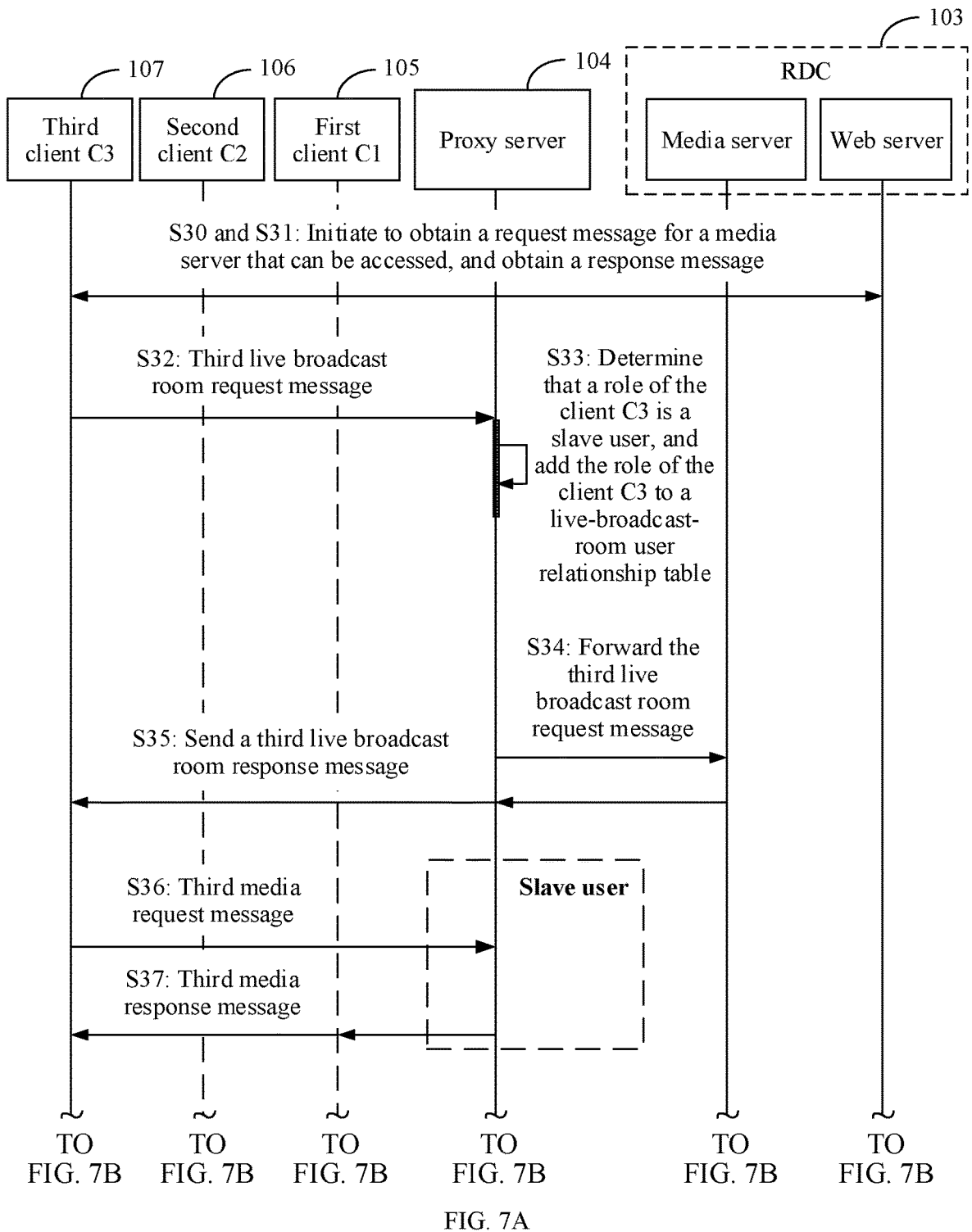
FIG. 7A and FIG. 7B are a signaling flowchart of still another media stream sending method according to an embodiment.
Figure 7B:
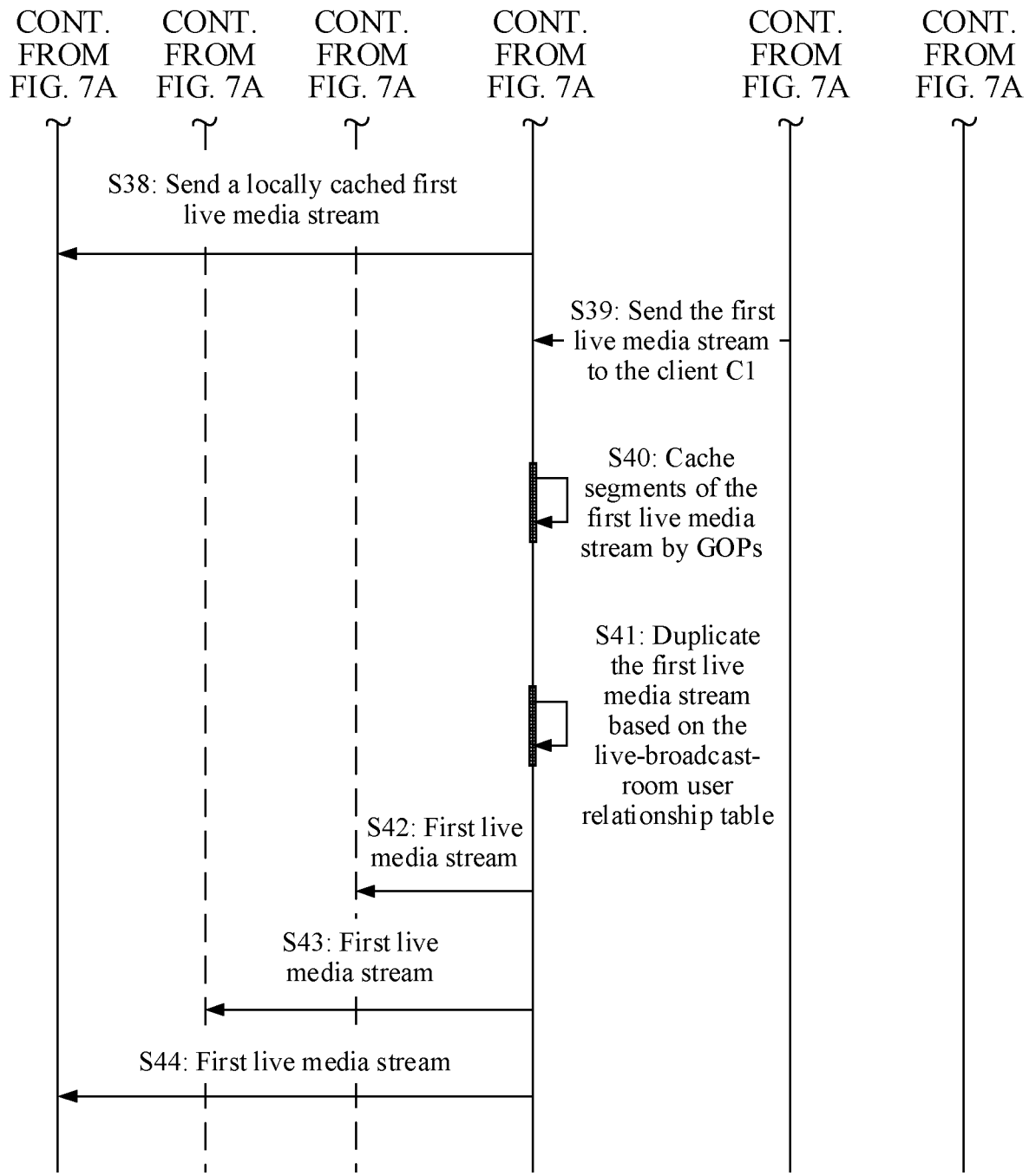

S30 to S44 are a process in which the client C3 enters the live broadcast room, and requests and obtains a live media stream. As shown in FIG. 7A and FIG. 7B, details are as follows.

S30 and S31 are a process in which the client C3 enters the live broadcast room, initiates a request message for obtaining a media server that can be accessed, and obtains a response message. The process is the same as S13 and S14 in Embodiment 1. Details are not described again.

S32: The client C3 sends, to the proxy server, a third live broadcast room request message for requesting to enter the live broadcast room, where the third live broadcast room request message includes a third identifier of the client C3.

S33: The proxy server receives the third live broadcast room request message, and determines a user role of the client C3. Specifically, when the third live broadcast room request message is obtained, if the quantity of clients whose roles are master users in the current live broadcast room reaches the preset upper limit (the preset upper limit is 2), the proxy server determines that the role of the client C3 is a slave user.

In addition, the method further includes: adding an entry about the client C3 to the "live-broadcast-room user relationship table", where content of the entry includes information such as a name, an IP address, a port number, and a user role that are of the client C3, a name of the live broadcast room, and a name, an IP address, and a port number that are of the media server.

S34: The proxy server forwards the third live broadcast room request message to the media server.

S35: The media server sends a third live broadcast room response message to the client C3, where the third live broadcast room response message is used to notify the client C3 that the client C3 successfully enters the live broadcast room.

S36: The client C3 sends a third media request message to the proxy server, where the third media request message is used to request to obtain a live media stream from the media server, and the third media request message includes the identifier of the client C3.

S37: The client C3 receives a third media response message that is fed back based on the third media request message by the proxy server. In this case, the role of the client C3 is the slave user.

S38: The proxy server sends the locally cached first live media stream to the client C3.

S39: The media server sends the first live media stream to the client C1 in real time.

S40: After receiving the first live media stream, the proxy server caches segments of the first live media stream by GOPs.

S41: The proxy server duplicates the first live media stream based on the "live-broadcast-room user relationship table", and specifically makes two copies of the first live media stream, where one copy is for the client C2 whose role is the secondary-master user and the other copy is for the client C3 whose role is the slave user.

S42: The proxy server sends the first live media stream to the client C1. In addition, the method further includes: The proxy server adjusts a timestamp of the first live media stream.

S43: The proxy server sends the first live media stream to the client C2. In addition, the method further includes: The proxy server adjusts a timestamp of the first live media stream.

S44: The proxy server sends the first live media stream to the client C3. In addition, the method further includes: The proxy server adjusts a timestamp of the first live media stream.

According to the method of this embodiment, when obtaining media requests of different clients, the proxy server identifies a user role of each client, so that the proxy server obtains, from the media server, only the live media stream of the master user. There are the main-master user and the secondary-master user. The live media stream is not obtained for the slave user, but the segments of the first live media stream locally cached by the proxy server is sent to the corresponding client. This prevents the media server from sending the live media stream to the client serving as the slave user, and further reduces a quantity of live media streams requested by clients whose roles are slave users in the live broadcast room. Using this method reduces resource overheads for live media stream transmission between the media server and the proxy server.

Figure 8A:
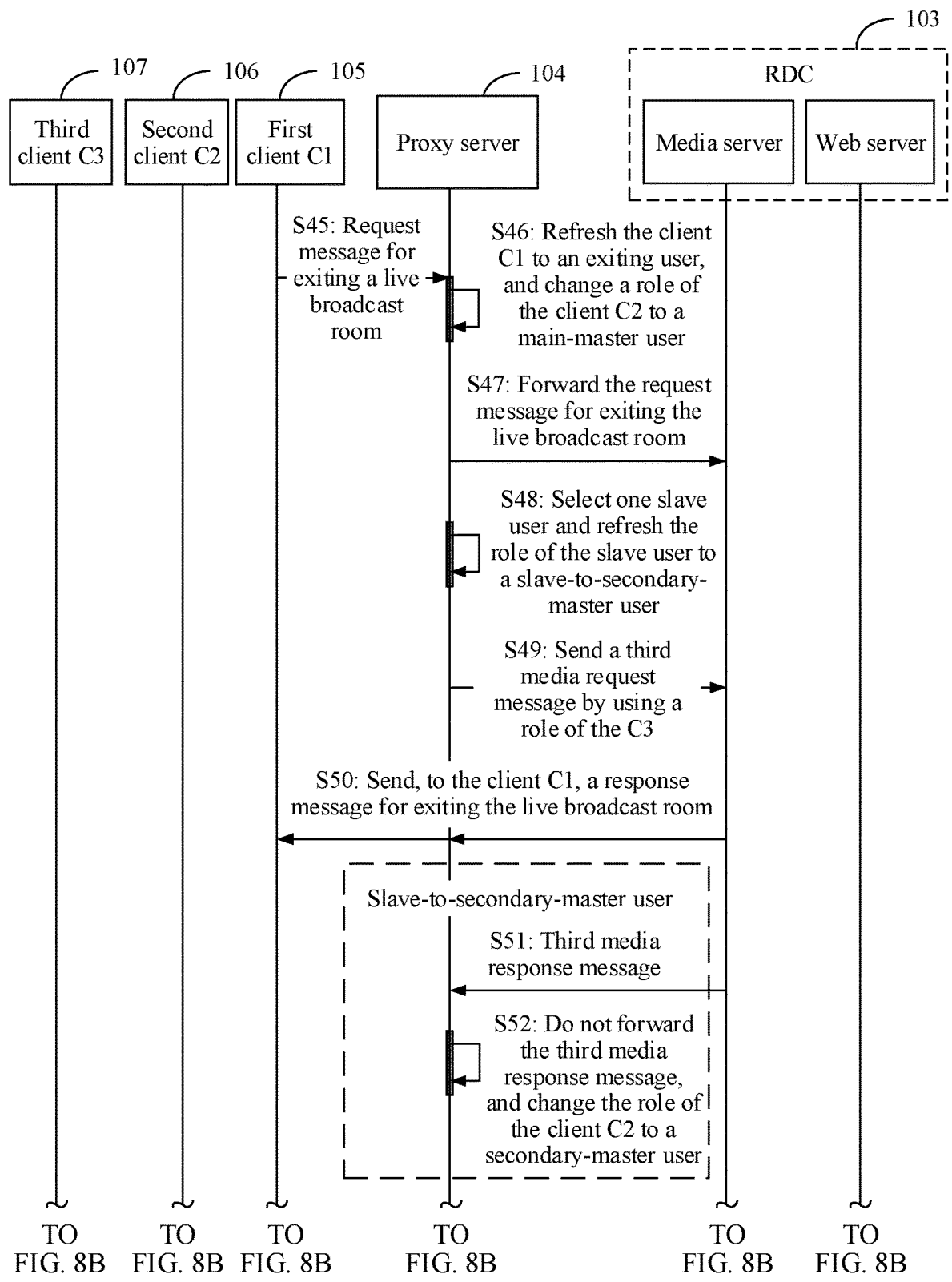
FIG. 8A and FIG. 8B are a signaling flowchart of still another media stream sending method according to an embodiment.
Figure 8B:
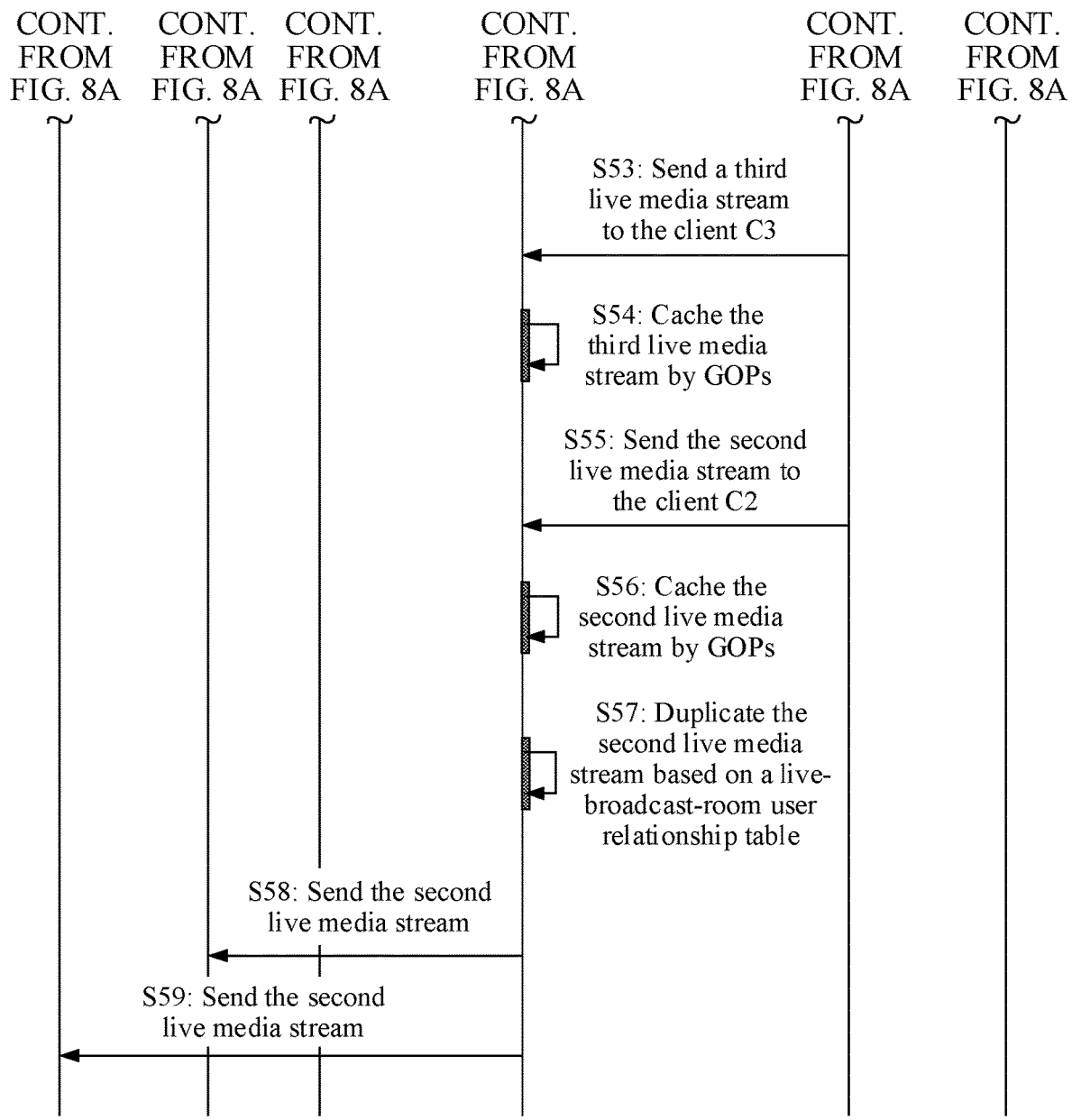

In addition, the method provided in this embodiment further includes the following process: After the client C1 exits the live broadcast room, the media server continues to send a live media stream to the client C2 and the client C3 in the live broadcast room. Specifically, as shown in FIG. 8A and FIG. 8B, the process includes S45 to S59. The method procedure is similar to the exiting process of the client C1 in Embodiment 1, but differs in that identity roles configured for the client C2 and the client C3 in the live broadcast room are different and live media streams that are sent to the client C2 and the client C3 are different. Specifically, as shown in FIG. 8A and FIG. 8B, the method includes the following steps.

S45: The client C1 sends, to the proxy server, a request message for exiting the live broadcast room.

S46: The proxy server receives, from the client C1, the request message for exiting the live broadcast room, marks the user role of the client C1 as an exiting user in the "live-broadcast-room user relationship table", and changes the user role of the client C2 to the main-master user.

S47: The proxy server forwards the request message for exiting the live broadcast room to the media server.

S48: The proxy server selects one slave user from all slave users identified in the live-broadcast-room user relationship table, and changes the slave user to a slave to secondary master user. In this embodiment, the selected and changed client is the client C3.

S49: The proxy server sends the third media request message to the media server, where the third media request message carries the third identifier of the client C3. In other words, the proxy server sends the third media request message to the media server by using the role of the client C3.

S50: The media server sends the response message for exiting the live broadcast room to the client C1 through the proxy server, where the response message for exiting the live broadcast room is used to notify the client C1 that the client C1 successfully exits the live broadcast room. In addition, the method further includes: The proxy server deletes the related entry of the client C1 from the "live-broadcast-room user relationship table".

S51: The proxy server receives the third media response message that is fed back by the media server based on the third media request message.

S52: The current role of the client C3 is the slave to secondary master user, and the proxy server temporarily does not forward the third media response message, but changes the user role of the client C3 to the secondary-master user in the "live-broadcast-room user relationship table".

S53: The media server sends a third live media stream to the client C3 through the proxy server, and accordingly the proxy server receives the third live media stream.

S54: The proxy server caches the third live media stream by GOPs, and aligns the third live media stream and the second live media stream according to an alignment algorithm. A specific process of aligning the live media streams is similar to S34 in the foregoing Embodiment 1. For details, refer to the related descriptions in S34. Details are not described herein again.

In this embodiment, when the client serving as the main-master user in the live broadcast room exits, a live media stream is requested by using an identity of the secondary-master user that does not exit the live broadcast room, a role of the client that obtains the live media stream is changed, and alignment is performed on a received new live media stream. In this way, there are no repeatedly played pictures and played video content is integral when other users watch the live video, so that the other users are not affected when the master user exits the live broadcast room.

Between step S46 and step S47, the proxy server switches the first live media stream that is sent to the client (for example, the client C2) in the live broadcast room to the second live media stream. The media server continuously sends the second live media stream to the client C2 through the proxy server. After the switching, the proxy server delivers the continuously received second live media stream to the client in the live broadcast room. For details, refer to subsequent steps.

S55: The media server sends the second live media stream to the client C2.

S56: The proxy server caches the second live media stream by GOPs. In addition, the method further includes: The proxy server adjusts a timestamp of the second live media stream.

S57: The proxy server duplicates the second live media stream based on the "live-broadcast-room user relationship table", where a quantity of copies is a quantity of all clients whose roles are not exiting users in the live broadcast room.

S58: The proxy server sends the second live media stream to the client C2. In addition, the method further includes: The proxy server adjusts a timestamp of the second live media stream.

S59: The proxy server sends the second live media stream to the client C3. In addition, the method further includes: The proxy server adjusts a timestamp of the second live media stream.

Specifically, for a timestamp adjustment process, refer to the descriptions in the foregoing embodiment. Details are not described in this embodiment.

According to the method provided in this embodiment, when the client C1 whose role is the main-master user requests to exit the live broadcast room, after the proxy server receives, from the client C1 serving as the main-master user, the request message for exiting the live broadcast room, the client C1 temporarily does not forward the request message from the user, for exiting the live broadcast room. Instead, the proxy server selects a client as the new main-master user, and the role of the new main-master user is used to request a live media stream. The proxy server duplicates and delivers the live media stream to other clients, and makes alignment during delivery of the media streams. This ensures that other clients that are watching a media stream are not affected when the master user corresponding to the watched media stream exits.

Optionally, the method provided in this embodiment further includes a process in which the client C2 whose role is the secondary-master user also requests to exit the live broadcast room. This process is similar to the foregoing process in which the client C1 exits the live broadcast room.

Specifically, as shown in FIG. 8A and FIG. 8B, between step S52 and step S53, the following step is further included: The client C2 sends, to the proxy server, a request message for exiting the live broadcast room, where the request message includes related information of the client C2. When the proxy server receives, from the client C2, the request message for exiting the live broadcast room, because the live media stream that is sent to the client C2 is being watched, the user role of the client C2 is refreshed to an exiting user. In this case, the request message, from the client C2, for exiting the live broadcast room is not forwarded temporarily.

Then, after S54, the method further includes: The proxy server determines that the client C2 corresponding to the media stream that is being watched exits, and the proxy server smoothly switches, based on a relative location of a frame that each user watches, the live media stream to the media stream that is sent to the client C3, and refreshes the role of the client C3 to the main-master user. In addition, the method further includes: The proxy server forwards the request message, from the client C2, for exiting the live broadcast room to the media server; receives the response message that is for exiting the live broadcast room and that is sent by the media server to the client C2; and forwards the response message for exiting the live broadcast room to the client C2. In addition, the method further includes: The proxy server deletes the entry corresponding to the client C2 from the "live-broadcast-room user relationship table".

Finally, after receiving the third live media stream from the media server, the proxy server locally caches the third live media stream by GOPs, duplicates and delivers the third live media stream to all clients that are not exiting users in the live broadcast room. In this case, there is only the client C3 in the live broadcast room, and the proxy server sends, to the client C3, a live media stream sent by the media server. Optionally, when sending the live media stream to the client C3, the proxy server further adjusts a timestamp in the media stream based on play time of a video frame of a user, to avoid affecting user experience of the client C3. In this way, there are no repeatedly played parts of a media stream video and played video content is integral when the client C1 and the client C2 exit the live broadcast room.

According to the unilateral video live broadcast technology provided in this embodiment, the proxy server requests and obtains, from the media server by identifying and by using a user role, the media stream of the client whose role is the master user; duplicates and delivers the media stream requested by the main-master user to other users in the same live broadcast room. In this way, when the users in the same live broadcast room watch the media video, for media streams that are transmitted from the media server to the proxy server, only the media stream that is requested by the master user consumes bandwidth. This effectively reduces egress bandwidth costs and wide area network link load. In addition, according to the method, the media server does not need to configure independent authentication for the client, thereby further reducing operation and maintenance costs.

The following describes apparatus and hardware device embodiments corresponding to the foregoing method embodiments.

Figure 9:
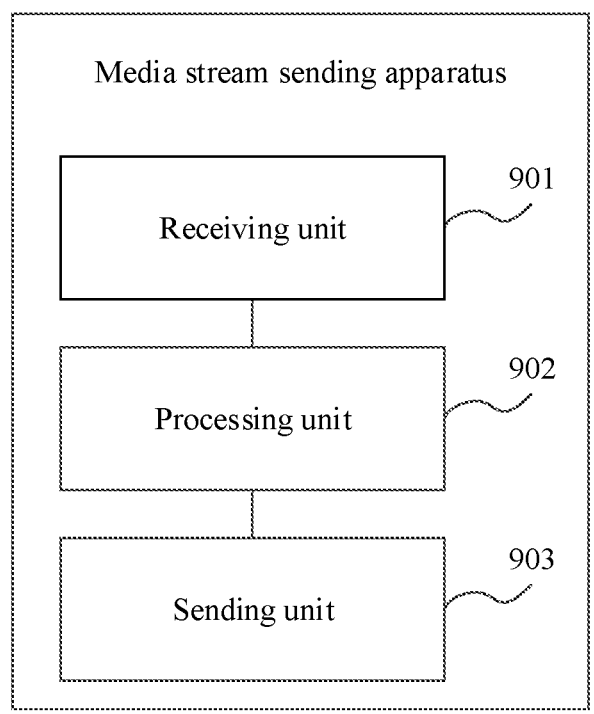
FIG. 9 is a schematic structural diagram of a media stream sending apparatus according to an embodiment.

FIG. 9 is a schematic structural diagram of a media stream sending apparatus according to an embodiment. The apparatus may be the proxy server described in the foregoing embodiments.

Further, the apparatus includes a receiving unit 901, a processing unit 902, and a sending unit 903. In addition, the apparatus may further include another functional module or unit, for example, a storage unit. The apparatus may be a server, and is configured to perform the media stream sending method in the foregoing embodiments. For example, the apparatus provides a live media stream for at least two users that enter a live broadcast room.

Specifically, the receiving unit 901 is configured to receive, from a first client, a first live broadcast room request message for requesting to enter the live broadcast room. The processing unit 902 is configured to: determine a role of the first client based on the first live broadcast room request message, and determine the role of the first client. The sending unit 903 is configured to: when it is determined that the role of the first client is a slave user, send a locally cached first live media stream to the first client, where the first live media stream is a media stream that is forwarded by a media server to a second client through the proxy server, and a role of the second client is a master user.

Optionally, in a specific implementation of this embodiment, the processing unit 902 is further configured to: determine whether there is a client whose role is a master user in the live broadcast room when the first live broadcast room request message is received; and if there is a client whose role is a master user in the live broadcast room, determine that the role of the first client is the slave user, or if there no client whose role is a master user in the live broadcast room, determine that the role of the first client is the master user.

Optionally, in another specific implementation of this embodiment, the receiving unit 901 is further configured to: before the first live media stream is sent to the first client, receive a first media request message from the first client, and skip forwarding the first media request message to the media server; and the sending unit 903 is further configured to send a first media response message to the first client, where the first media response message is used to notify the first client that the first client is allowed to obtain a media stream.

Optionally, in still another specific implementation of this embodiment, the first media request message includes an identifier of the first client. The receiving unit 901 is further configured to: after the first live media stream is sent to the first client, receive, from the second client, a request message for exiting the live broadcast room. The processing unit 902 is further configured to: when determining the first client as a new master user, change the role of the first client from the slave user to the master user. The sending unit 903 is further configured to send a second media request message to the media server, where the second media request message includes the identifier of the first client. The receiving unit 901 is further configured to receive a second live media stream that is sent by the media server based on the second media request message. The sending unit 903 is further configured to switch, to the second live media stream, the first live media stream that is sent to the first client.

Optionally, in still another specific implementation of this embodiment, the processing unit 902 is further configured to: determine whether a quantity of clients whose roles are master users in the live broadcast room reaches a preset upper limit when the first live broadcast room request message is received, where the preset upper limit is greater than 1; and if the quantity of clients whose roles are master users in the live broadcast room reaches the preset upper limit, determine that the role of the first client is the slave user.

Optionally, in still another specific implementation of this embodiment, the processing unit 902 is further configured to: if the quantity of clients whose roles are master users in the live broadcast room is not 0 but does not reach the preset upper limit, determine that the role of the first client is a secondary-master user.

Optionally, in still another specific implementation of this embodiment, when the first client is the slave user, the receiving unit 901 is further configured to receive, from the second client, a request message for exiting the live broadcast room. The processing unit 902 is further configured to: when determining the first client as a new secondary-master user, change the role of the first client from the slave user to the secondary-master user. The sending unit 903 is further configured to send a third media request message to the media server, where the third media request message includes an identifier of the first client. The receiving unit 901 is further configured to receive a third live media stream that is sent by the media server based on the third media request message.

Optionally, in still another specific implementation of this embodiment, when the second client is a main-master user, and the first client is the secondary-master user, the sending unit 903 is further configured to send the first live media stream to the first client.

Optionally, in still another specific implementation of this embodiment, when the first client is the secondary-master user, the receiving unit 901 is further configured to receive a fourth media request message from the first client. The sending unit 903 is further configured to send the fourth media request message to the media server. The receiving unit 901 is further configured to receive a fourth live media stream that is sent by the media server based on the fourth media request message.

Optionally, in still another specific implementation of this embodiment, when the first client is the secondary-master user, the receiving unit 901 is further configured to receive, from the second client, a request message for exiting the live broadcast room. The processing unit 902 is further configured to: when determining the first client as a new main-master user, change the role of the first client from the secondary-master user to the main-master user. The sending unit 903 is further configured to switch, to the fourth live media stream, the first live media stream that is sent to the first client.

Optionally, in still another specific implementation of this embodiment, the processing unit 902 is further configured to adjust a timestamp of the fourth live media stream, so that an adjusted timestamp satisfies that a timestamp of the first frame of the fourth live media stream that is sent to the first client and a timestamp of the last frame of the first live media stream that is sent to the first client are consecutive.

The last frame of the first live media stream that is sent to the first client and the first frame of the fourth live media stream that is sent to the first client are adjacent frames.

The processing unit 902 is further configured to: before switching, to the fourth live media stream, the first live media stream that is sent to the first client, identify, based on the cached first live media stream and the fourth live media stream, a first I frame and a second I frame that belong to the first live media stream and the fourth live media stream respectively, where the first I frame and the second I frame are a same video frame; and determine, based on the first I frame and the second I frame, a first switching frame and a second switching frame that are adjacent to each other and that belong to the first live media stream and the fourth live media stream respectively, and use the first switching frame and the second switching frame as the last frame of the first live media stream that is sent to the first client and the first frame of the fourth live media stream that is sent to the first client respectively.

Optionally, in still another specific implementation of this embodiment, the apparatus further includes the storage unit configured to cache the first live media stream as GOPs. In addition, the storage unit further locally stores the second live media stream and the third live media stream by GOPs.

Optionally, in still another specific implementation of this embodiment, the processing unit 902 is further configured to: before switching, to the second live media stream, the first live media stream that is sent to the first client, adjust a timestamp of the second live media stream, so that an adjusted timestamp satisfies that a timestamp of the first frame of the second live media stream that is sent to the first client and a timestamp of the last frame of the first live media stream that is sent to the first client are consecutive. "Consecutive" may be understood as that time lengths of adjacent video frames of the second live media stream received by the first client are the same, and the time length is a reciprocal of a frame rate parameter f.

Optionally, in still another specific implementation of this embodiment, the last frame of the first live media stream that is sent to the first client and the first frame of the second live media stream that is sent to the first client are adjacent frames.

The processing unit 902 is further configured to: before switching, to the second live media stream, the first live media stream that is sent to the first client, identify, based on the first live media stream and the second live media stream, a first I frame and a second I frame that belong to the first live media stream and the second live media stream respectively, where the first I frame and the second I frame are a same video frame; and determine, based on the first I frame and the second I frame, a first switching frame and a second switching frame that are adjacent to each other and that belong to the first live media stream and the second live media stream respectively, and use the first switching frame and the second switching frame as the last frame of the first live media stream that is sent to the first client and the first frame of the second live media stream that is sent to the first client respectively.

The sending unit 903 is further configured to: after the first switching frame and the second switching frame are determined, forward, to the media server, the request message, from the second client, for exiting the live broadcast room.

Optionally, in still another specific implementation of this embodiment, the processing unit 902 is further configured to: before the first live media stream is sent to the first client, adjust a timestamp of the first live media stream, so that an adjusted timestamp satisfies that a timestamp of the first frame of the first live media stream that is sent to the first client is 0, and timestamps of adjacent frames of the first live media stream that is sent to the first client are consecutive.

Figure 10:
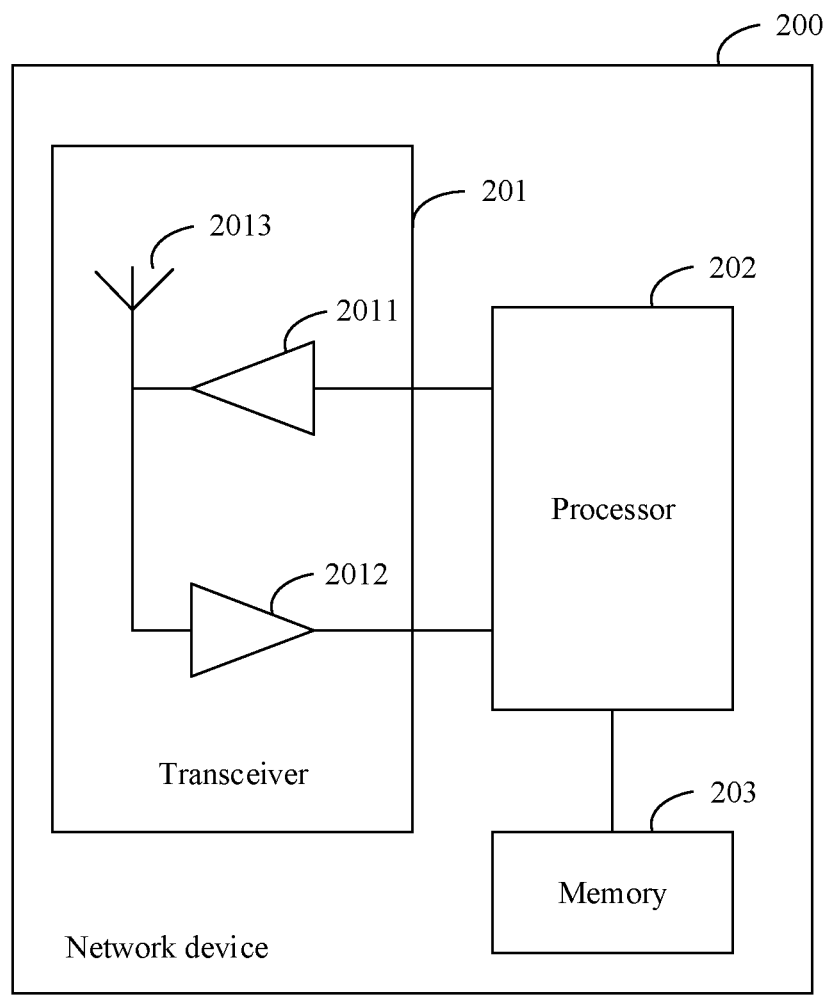
FIG. 10 is a schematic structural diagram of a network device according to an embodiment.

In specific hardware implementation, as shown in FIG. 10, this disclosure further provides a network device. The network device 200 may be the proxy server in the foregoing method embodiments.

Specifically, the network device 200 includes a transceiver 201, a processor 202, and a memory 203. The network device may further include more or fewer components, or combine some components, or have different component arrangements. This is not limited in this disclosure.

The transceiver 201 is configured to receive and send a live media stream, and perform data transmission with another device (such as a client or an RDC) in a network, for example, send and receive a request message and a response message. Further, the transceiver 201 may include components such as a receiver 2011, a transmitter 2012, and an antenna 2013, or may include a transceiver module. Further, the transceiver module may include a communications module such as a wireless local area network (WLAN) module, a Bluetooth module, or a baseband module, and may include a radio frequency (RF) circuit corresponding to the communications module, where the radio frequency circuit is configured to perform wireless local area network communication, Bluetooth communication, infrared communication, and/or cellular communications system communication, for example, wideband code-division multiple access (WCDMA) and/or high-speed downlink packet access (HSDPA). The transceiver module is configured to control communication between components in the network device, and may support direct memory access.

The processor 202 is a control center of the network device, and is connected to various parts of the entire network device through various interfaces and lines. The processor 202 runs or executes a software program and/or a unit stored in the memory 203, and invokes data stored in the memory 203, to perform various functions of the network device and/or process data.

Further, the processor 202 may include an integrated circuit (IC), for example, may include a single packaged IC, or may include a plurality of connected packaged ICs that have a same function or different functions. For example, the processor may include only a central processing unit (CPU), or may be a combination of a GPU, a digital signal processor (DSP), and a control chip (such as a baseband chip) in the transceiver.

The memory 203 may include a volatile memory, for example, a random-access memory (RAM); or may include a non-volatile memory, for example, a flash memory, a hard disk drive (HDD), or a solid-state drive (SSD). The memory may further include a combination of the foregoing types of memories. The memory may store a program or code. The processor 202 executes the program or the code to implement functions of the communications device.

In this embodiment, when the network device is used as the proxy server, functions of the receiving unit 901 and the sending unit 903 in the apparatus embodiment shown in FIG. 9 may be implemented by the transceiver 201, or implemented by the transceiver 201 controlled by the processor 202; a function to be implemented by the processing unit 902 may be implemented by the processor 202; and a function of the storage unit may be implemented by the memory 203.

In addition, an embodiment further provides a media stream sending system. The system includes the media stream sending apparatus shown in FIG. 9 or the network device shown in FIG. 10, and further includes devices such as a plurality of clients, an RDC, an EDC, and a content source, to implement the media stream sending method in the foregoing method embodiments.

Optionally, the media stream sending system is a video live broadcast system, for example, a CDN system.

In addition, this disclosure further provides a computer storage medium. The computer storage medium may store a program, and when the program is executed, a part of or all of the steps of the embodiments of the media stream sending method may be performed. The storage medium may be a magnetic disk, an optical disc, a read-only memory (ROM), a RAM, or the like.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program is loaded and executed on a computer, all or some of the procedures or functions according to the foregoing embodiments are generated. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a web site, a computer, a server, or a data center to another web site, computer, server, or data center in a wired or wireless manner.

For same or similar parts in the embodiments in this specification, refer to each other. Especially, an embodiment of the media stream sending apparatus is basically similar to a method embodiments, and therefore is described briefly. For related parts, refer to descriptions in the method embodiments.

A person skilled in the art may clearly understand that, the technologies in the embodiments may be implemented by software in addition to a necessary general hardware platform. Based on such an understanding, the technical solutions in the embodiments essentially, or the part contributing to the conventional technology may be implemented in the form of a software product. The computer software product may be stored in a storage medium, such as a ROM/RAM, a magnetic disk, or an optical disc, and includes several instructions for indicating a computer device (which may be a personal computer, a server, a network device, or the like) to perform the methods described in the embodiments or some parts of the embodiments.

For same or similar parts in the embodiments in this specification, refer to each other. In particular, the embodiments of the media stream sending apparatus are basically similar to the method embodiments, and therefore are described briefly. For related parts, refer to descriptions in the method embodiments.

In addition, "a plurality of" means two or more than two, unless otherwise specified. In addition, for convenience of clear description of the technical solutions in the embodiments, terms such as "first", "second", and the like are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

The foregoing implementations are not intended to limit the protection scope of this disclosure.

What is claimed is:

1. A method implemented by a proxy server and comprising:
   receiving, from a first client, a first live broadcast room request message requesting to enter a live broadcast room;
   determining a first role of the first client based on the first live broadcast room request message;
   sending, to the first client when the first role is a slave user in the live broadcast room, a first live media stream cached in the proxy server;
   receiving, from a second client whose second role is a master user, a request message for exiting the live broadcast room;
   determining not to forward the request message for a temporary period;
   changing, in response to the request message, the first role from the slave user to the master user;
   sending, to a media server, a second media request message comprising an identifier of the first client;
   receiving, from the media server in response to the second media request message, a second live media stream;
   switching from sending, to the first client, the first live media stream to sending, to the first client, the second live media stream; and
   forwarding, to the media server after the switching, the request message.

2. The method of claim 1, further comprising:
   determining whether there is a client whose role is the master user in the live broadcast room; and
   determining that the first role is the slave user when there is a client whose role is the master user in the live broadcast room.

3. The method of claim 2, wherein before sending the first live media stream, the method further comprises:
   receiving, from the first client, a first media request message;
   determining not to forward, to the media server, the first media request message; and
   sending, to the first client, a first media response message notifying the first client that the first client is allowed to obtain a media stream.

4. The method of claim 3, wherein the first media request message comprises the identifier.

5. The method of claim 4, wherein before the switching, the method further comprises adjusting a second timestamp of a first frame of the second live media stream to an adjusted timestamp so that the adjusted timestamp and a first timestamp of a last frame of the first live media stream are consecutive.

6. The method of claim 4, wherein before the switching, the method further comprises:
   identifying, based on the first live media stream, a first I frame that belongs to the first live media stream;
   identifying, based on the second live media stream, a second I frame, wherein the first I frame and the second I frame have the same media content;
   determining, based on the first I frame, a first switching frame that belongs to the first live media stream;
   determining, based on the second I frame, a second switching frame that belongs to the second live media stream and that is adjacent to the first switching frame;

using the first switching frame as a last frame of the first live media stream that is sent to the first client; and
using the second switching frame as a first frame of the second live media stream that is sent to the first client respectively.

7. The method of claim 1, further comprising:
determining whether a quantity of clients whose roles are master users in the live broadcast room has reached a preset upper limit; and
determining that the first role is the slave user when the quantity has reached the preset upper limit.

8. The method of claim 7, further comprising determining that the first role is a secondary master user when the quantity is greater than 0 but less than the preset upper limit.

9. The method of claim 1, further comprising caching the first live media stream as groups of pictures (GOPs).

10. A proxy server comprising:
a memory configured to store instructions; and
a processor coupled to the memory and configured to execute the instructions to cause the proxy server to:
receive, from a first client, a first live broadcast room request message requesting to enter a live broadcast room;
determine a first role of the first client based on the first live broadcast room request message;
send, to the first client when the first role is a slave user in the live broadcast room, a first live media stream cached in the proxy server;
receive, from a second client whose second role is a master user, a request message for exiting the live broadcast room;
determine not to forward the request message for a temporary period;
change, in response to the request message, the first role from the slave user to the master user;
send, to a media server, a second media request message comprising an identifier of the first client;
receive, from the media server in response to the second media request message, a second live media stream;
switch from sending, to the first client, the first live media stream to sending, to the first client, the second live media stream; and
forward, to the media server after the switching, the request message.

11. The proxy server of claim 10, wherein the processor is further configured to cause the proxy server to:
determine whether there is a client whose role is the master user in the live broadcast room; and
determine that the first role is the slave user when there is a client whose role is the master user in the live broadcast room.

12. The proxy server of claim 11, wherein before sending the first live media stream, the processor is further configured to cause the proxy server to:
receive, from the first client, a first media request message;
determine not to forward, to the media server, the first media request message; and
send, to the first client, a first media response message notifying the first client that the first client is allowed to obtain a media stream.

13. The proxy server of claim 12, wherein the first media request message comprises the identifier.

14. The proxy server of claim 13, wherein before the switching, the processor is further configured to cause the proxy server to adjust a second timestamp of a first frame of the second live media stream to an adjusted timestamp so that the adjusted timestamp and a first timestamp of a last frame of the first live media stream are consecutive.

15. The proxy server of claim 13, wherein before the switching, the processor is further configured to cause the proxy server to:
identify, based on the first live media stream, a first I frame that belongs to the first live media stream;
identify, based on the second live media stream, a second I frame, wherein the first I frame and the second I frame have the same media content;
determine, based on the first I frame, a first switching frame that belongs to the first live media stream;
determine, based on the second I frame, a second switching frame that belongs to the second live media stream and that is adjacent to the first switching frame;
use the first switching frame as a last frame of the first live media stream that is sent to the first client; and
use the second switching frame as a first frame of the second live media stream that is sent to the first client respectively.

16. The proxy server of claim 10, wherein the processor is further configured to cause the proxy server to:
determine whether a quantity of clients whose roles are master users in the live broadcast room has reached a preset upper limit; and
determine that the first role is the slave user when the quantity has reached the preset upper limit.

17. The proxy server of claim 16, wherein the processor is further configured to cause the proxy server to determine that the first role is a secondary master user when the quantity is greater than 0 but less than the preset upper limit.

18. The proxy server of claim 10, wherein the processor is further configured to execute the instructions to cause the proxy server to cache the first live media stream as groups of pictures (GOPs).

19. A computer program product comprising instructions that are stored on a non-transitory computer-readable medium and that, when executed by a processor, cause a proxy server to:
receive, from a first client, a first live broadcast room request message requesting to enter a live broadcast room;
determine a first role of the first client based on the first live broadcast room request message;
send, to the first client when the first client is a slave user in the live broadcast room, a first live media stream cached in the proxy server;
receive, from a second client whose second role is a master user, a request message for exiting the live broadcast room;
determine not to forward the request message for a temporary period;
change, in response to the request message, the first role from the slave user to the master user;
send, to a media server, a second media request message comprising an identifier of the first client;
receive, from the media server in response to the second media request message, a second live media stream;
switch from sending, to the first client, the first live media stream to sending, to the first client, the second live media stream; and
forward, to the media server after the switching, the request message.

20. The computer program product of claim 19, wherein the instructions, when executed by the processor, further cause a proxy server to:
- determine whether there is a client whose role is the master user in the live broadcast room; and
- determine that the first role is the slave user when there is a client whose role is the master user in the live broadcast room.

\* \* \* \* \*